(12) United States Patent
Ko et al.

(10) Patent No.: US 12,189,895 B2
(45) Date of Patent: Jan. 7, 2025

(54) ELECTRONIC DEVICE SENSING CONTACT OF FLUID THROUGH TOUCH SENSOR

(71) Applicant: Samsung Electronics Co., Ltd., Suwon-si (KR)

(72) Inventors: Bongjun Ko, Suwon-si (KR); Sanghun Kwak, Suwon-si (KR); Dongnam Byun, Suwon-si (KR); Jongmin Wi, Suwon-si (KR); Hoondo Heo, Suwon-si (KR); Jinyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/406,567

(22) Filed: Jan. 8, 2024

(65) Prior Publication Data

US 2024/0345680 A1    Oct. 17, 2024

Related U.S. Application Data

(63) Continuation of application No. PCT/KR2024/000129, filed on Jan. 3, 2024.

(30) Foreign Application Priority Data

Apr. 12, 2023  (KR) .......... 10-2023-0048349
May 12, 2023  (KR) .......... 10-2023-0062042

(51) Int. Cl.
*G06F 3/041*  (2006.01)
*G06F 3/044*  (2006.01)
(Continued)

(52) U.S. Cl.
CPC ........ *G06F 3/0418* (2013.01); *G06N 3/0464* (2023.01); *G06N 3/08* (2013.01);
(Continued)

(58) Field of Classification Search
CPC .... G06F 3/0418; G06F 3/0443; G06F 3/0446; G06N 3/0464; G06N 3/08
See application file for complete search history.

(56) References Cited

U.S. PATENT DOCUMENTS 9,965,096 B2 *  5/2018  Jeon ...................... G06F 3/0445
10,345,976 B2   7/2019  Fang et al.
(Continued)

FOREIGN PATENT DOCUMENTS

CN    108693766 A    10/2018
CN    115052069 A    9/2022
(Continued)

*Primary Examiner* — Amy Onyekaba
(74) *Attorney, Agent, or Firm* — Jefferson IP Law, LLP

(57) ABSTRACT

An electronic device is provided. The electronic device includes a display, a touch sensor disposed in the display and including a plurality of lines and a plurality of nodes formed by the plurality of lines, a memory storing instructions, and a processor. The instructions, when being executed by the processor, cause the electronic device to obtain a plurality of node values from each of the plurality of nodes, change the touch sensitivity of the touch sensor from a first touch sensitivity to a second touch sensitivity lower than the first touch sensitivity based on identifying a pattern by the plurality of node values, identify whether to recognize contact on the touch sensor as a touch input through the plurality of line values obtained from each of the plurality of lines based on identifying changes of the pattern by the plurality of node values.

20 Claims, 22 Drawing Sheets

(51) Int. Cl.
*G06N 3/0464* (2023.01)
*G06N 3/08* (2023.01)

(52) U.S. Cl.
CPC .......... *G06F 3/0443* (2019.05); *G06F 3/0446* (2019.05); *G06F 2203/04102* (2013.01)

(56) References Cited

U.S. PATENT DOCUMENTS

| | | |
|---|---|---|
| 10,831,296 B1* | 11/2020 | Zhang .................... G06F 3/0412 |
| 10,976,278 B2* | 4/2021 | Chowdhury ............ G06F 3/044 |
| 11,163,400 B1* | 11/2021 | Leroy .................... G06F 3/0418 |
| 11,199,932 B2 | 12/2021 | Shimada et al. |
| 11,371,953 B2 | 6/2022 | Chowdhury et al. |
| 2014/0062950 A1* | 3/2014 | Chang ..................... G06F 3/045 |
| | | 345/174 |
| 2014/0198064 A1* | 7/2014 | Kim .................... G06F 3/04186 |
| | | 345/173 |
| 2015/0130754 A1* | 5/2015 | Yairi .................... G06F 3/0445 |
| | | 345/174 |
| 2016/0306491 A1* | 10/2016 | Lee ........................ G06F 3/0346 |
| 2023/0244345 A1* | 8/2023 | Uwai .................. G06F 3/04186 |
| | | 345/174 |
| 2024/0085185 A1* | 3/2024 | Jackson ............... G01C 21/165 |

FOREIGN PATENT DOCUMENTS

| | | | |
|---|---|---|---|
| JP | 7129653 | B1 | 9/2022 |
| KR | 10-2017-0066151 | A | 6/2017 |
| KR | 10-1963995 | B1 | 3/2019 |

* cited by examiner

|  |  |  |  |  |  |  |  |  |
|---|---|---|---|---|---|---|---|---|
| -11 | -4 | -4 | -2 | -12 | -6 | -2 | 1 | 2 |
| -15 | -16 | -11 | -9 | -10 | -9 | -6 | -5 | -2 |
| -16 | -8 | -5 | -14 | 4 | 9 | -16 | -6 | -1 |
| 51 | 12 | -3 | -10 | 25 | 11 | -32 | -9 | 6 |
| 240 | 79 | 16 | 51 | -24 | -62 | 33 | 9 | 33 |
| 179 | 61 | -4 | -5 | -8 | -14 | 8 | -3 | 1 |
| 2 | -2 | -9 | -26 | -2 | 19 | -19 | -11 | -6 |
| -13 | -22 | -16 | -13 | -13 | -9 | -3 | -9 | -3 |
| -12 | -5 | -8 | -9 | -12 | -11 | -3 | -1 | -1 |

FIG. 5B

|     |     |     |     |     |     |     |     |     |
|-----|-----|-----|-----|-----|-----|-----|-----|-----|
| -9  | -4  | -4  | -3  | -8  | -6  | 0   | 0   | 1   |
| -14 | -15 | -12 | -5  | -10 | -9  | -4  | -4  | -1  |
| -15 | -12 | -6  | -19 | 10  | 18  | -22 | -8  | -1  |
| 49  | 11  | -11 | -28 | 39  | 36  | 29  | -10 | 0   |
| 240 | 76  | 22  | 59  | -28 | -52 | 33  | 13  | 31  |
| 181 | 62  | 4   | 43  | -29 | -47 | 27  | 4   | -4  |
| 3   | -2  | -15 | -41 | 23  | 37  | -26 | -18 | -11 |
| -16 | -25 | -18 | -20 | -7  | 0   | -16 | -14 | 1   |
| -8  | -6  | -9  | -9  | -13 | -12 | 1   | 0   | 2   |

FIG. 5C

ELECTRONIC DEVICE SENSING CONTACT OF FLUID THROUGH TOUCH SENSOR

CROSS-REFERENCE TO RELATED APPLICATION(S)

This application is a continuation application, claiming priority under § 365(c), of an International application No. PCT/KR2024/000129, filed on Jan. 3, 2024, which is based on and claims the benefit of a Korean patent application number 10-2023-0048349, filed on Apr. 12, 2023, in the Korean Intellectual Property Office, and of a Korean patent application number 10-2023-0062042, filed on May 12, 2023, in the Korean Intellectual Property Office, the disclosure of each of which is incorporated by reference herein in its entirety.

BACKGROUND

Technical Field

The disclosure relates to an electronic device sensing a contact of a fluid through a touch sensor.

Description of Related Art

The electronic device may include a touch sensor for executing a designated function in response to a contact of an object on the display. The touch sensor may be included in the display. For example, the touch sensor may identify the contact based on a capacitive method, a resistive method, an infra-red method, an acoustic method, and/or a pressure method.

The above-described information may be provided as related art for the purpose of helping understanding of the present disclosure. No claim or decision has been made as to whether any of the above-described contents may be applied as a prior art related to the present disclosure.

SUMMARY

Aspects of the disclosure are to address at least the above-mentioned problems and/or disadvantages and to provide at least the advantages described below. Accordingly, an aspect of the disclosure is to provide an electronic device sensing a contact of a fluid through a touch sensor.

An electronic device is provided. According to an embodiment, the electronic device may comprise a display. According to an embodiment, the electronic device may comprise a touch sensor disposed in the display and including a plurality of lines, and a plurality of nodes formed by the plurality of lines. According to an embodiment, the electronic device may comprise a memory storing instructions. According to an embodiment, the electronic device may comprise a processor. According to an embodiment, the instructions, when being executed by the processor, cause the electronic device to obtain a plurality of node values from each of the plurality of nodes. According to an embodiment, the instructions, when being executed by the processor, cause the electronic device to change a touch sensitivity of the touch sensor from a first touch sensitivity to a second touch sensitivity lower than the first touch sensitivity based on identifying a pattern by the plurality of node values representing a fluid on the touch sensor. According to an embodiment, the instructions, when being executed by the processor, cause the electronic device to identify whether to recognize a contact on the touch sensor as a touch input through a plurality of line values obtained from each of the plurality of lines based on identifying a change of the pattern by the plurality of node values representing movement of the fluid on the touch sensor.

A method of operating an electronic device is provided. According to an embodiment, the method may comprise obtaining a plurality of node values from each of a plurality of nodes formed by a plurality of lines in a touch sensor. According to an embodiment, the method may comprise reducing a touch sensitivity of the touch sensor based on identifying a pattern by the plurality of node values representing a fluid on the touch sensor. According to an embodiment, the method may comprise identifying whether to recognize a contact on the touch sensor as a touch input through a plurality of line values obtained from each of the plurality of lines based on identifying a change of the pattern by the plurality of node values representing movement of the fluid on the touch sensor.

A computer-readable storage medium storing one or more programs is provided. According to an embodiment, the one or more programs, when executed by at least one processor of the electronic device, may include instructions that cause the electronic device for obtaining a plurality of node values from each of a plurality of nodes formed by a plurality of lines in a touch sensor. According to an embodiment, the one or more programs, when executed by at least one processor of the electronic device, may include instructions that cause the electronic device for changing a touch sensitivity of the touch sensor from a first touch sensitivity to a second touch sensitivity lower than the first touch sensitivity based on identifying a pattern by the plurality of node values representing a fluid on the touch sensor. According to an embodiment, the one or more programs, when executed by at least one processor of the electronic device, may include instructions that cause the electronic device for identifying whether to recognize a contact on the touch sensor as a touch input through a plurality of line values obtained from each of the plurality of lines based on identifying a change of the pattern by the plurality of node values representing movement of the fluid on the touch sensor.

BRIEF DESCRIPTION OF THE DRAWINGS

FIG. 5B shows an example of a plurality of node values in a state in which a fluid is contacted on an exemplary touch sensor according to an embodiment.

FIG. 5C shows an example of a plurality of node values in a state in which a fluid is contacted on an exemplary touch sensor according to an embodiment.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be appreciated that the blocks in each flowchart and combinations of the flowcharts may be performed by one or more programs which include instructions. The entirety of the one or more programs may be stored in a single memory or the one or more programs may be divided with different portions stored in different multiple memories.

Figure 1:
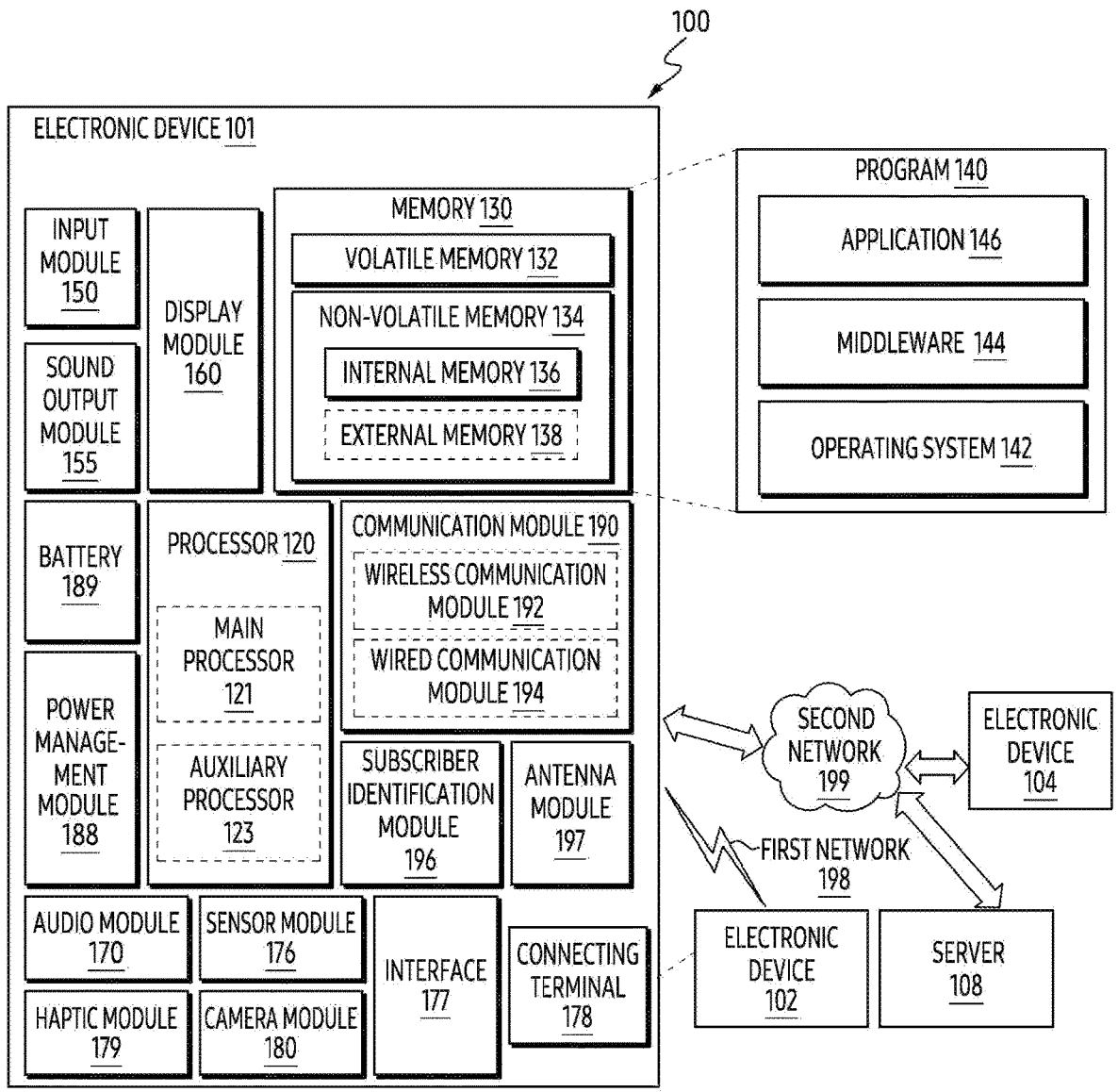
FIG. 1 is a block diagram of an electronic device in a network environment according to various embodiments.

FIG. 1 is a block diagram of an electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
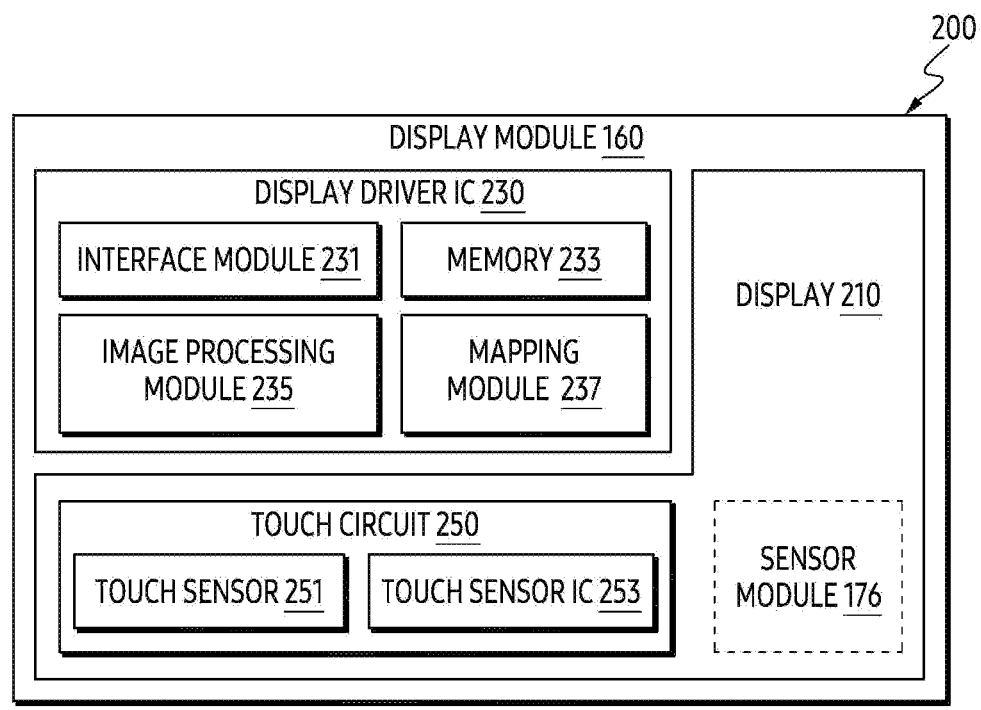
FIG. 2 is a block diagram of a display module according to various embodiments.

FIG. 2 is a block diagram 200 of a display module according to an embodiment of the disclosure.

Referring to FIG. 2, the display module 160 may include a display 210 and a display driver IC (DDI) 230 for controlling the display 210. The DDI 230 may include an interface module 231, memory 233 (e.g., a buffer memory), an image processing module 235, or a mapping module 237. The DDI 230 may receive, for example, image information including video data or an image control signal corresponding to a command for controlling the video data from another component of the electronic device 101 through the interface module 231. For example, according to an embodiment of the disclosure, the image information may be received from a processor 120 (e.g., a main processor 121 (e.g., an application processor)) or an auxiliary processor 123 (e.g., a graphics processing device) that operates independently of the function of the main processor 121. The DDI 230 may communicate with a touch circuit 250 or a sensor module 176 and the like through the interface module 231. In addition, the DDI 230 may store at least some of the received image information in the memory 233, for example, in units of frames. The image processing module 235, for example, may perform pre-processing or post-processing (e.g., resolution, brightness, or size adjustment) on at least a portion of the video data based at least in part on the characteristics of the video data or the characteristics of the display 210. The mapping module 237 may generate a voltage value or a current value corresponding to the video data pre-processed or post-processed through the image processing module 235. According to an embodiment of the disclosure, the generation of the voltage value or the current value, for example, may be performed based at least in part on the properties (e.g., the arrangement of pixels (RGB stripe or pentile structure), or the size of each subpixel) of the pixels of the display 210. At least some pixels of the display 210, for example, may display visual information (e.g., text, image, or icon) corresponding to the video data through the display 210, by driving based at least in part on the voltage value or the current value.

According to an embodiment of the disclosure, the display module 160 may further include the touch circuit 250. The touch circuit 250 may include a touch sensor 251 and a touch sensor IC 253 for controlling the touch sensor 251. For example, the touch sensor IC 253 may control the touch sensor 251 for sensing a touch input or a hovering input for a specific position of the display 210. For example, the touch sensor IC 253 may sense the touch input or the hovering input by measuring a change in a signal (e.g., voltage, light amount, resistance, or charge amount) for the specific position of the display 210. The touch sensor IC 253 may provide information (e.g., position, area, pressure, or time) regarding the sensed touch input or hovering input to the processor 120. According to an embodiment of the disclosure, at least a portion (e.g., the touch sensor IC 253) of the touch circuit 250 may be included as a portion of the display driver IC 230 or the display 210 or as a portion of other components (e.g., the auxiliary processor 123) disposed outside the display module 160.

According to an embodiment of the disclosure, the display module 160 may further include at least one sensor (e.g., a fingerprint sensor, an iris sensor, a pressure sensor, or an illuminance sensor) of the sensor module 176, or a control circuit therefor. In this case, the at least one sensor or the control circuit therefor may be embedded in a portion (e.g., the display 210 or the DDI 230) of the display module 160 or a portion of the touch circuit 250. For example, in case that the sensor module 176 embedded in the display module 160 includes a biometric sensor (e.g., the fingerprint sensor), the biometric sensor may obtain biometric information (e.g., a fingerprint image) associated with the touch input through a partial area of the display 210. For another example, in case that the sensor module 176 embedded in the display module 160 includes the pressure sensor, the pressure sensor may obtain pressure information associated with the touch input through a partial or the entire area of the display 210. According to an embodiment of the disclosure, the touch sensor 251 or the sensor module 176 may be disposed between pixels of a pixel layer of the display 210, or above or below the pixel layer.

Figure 3:
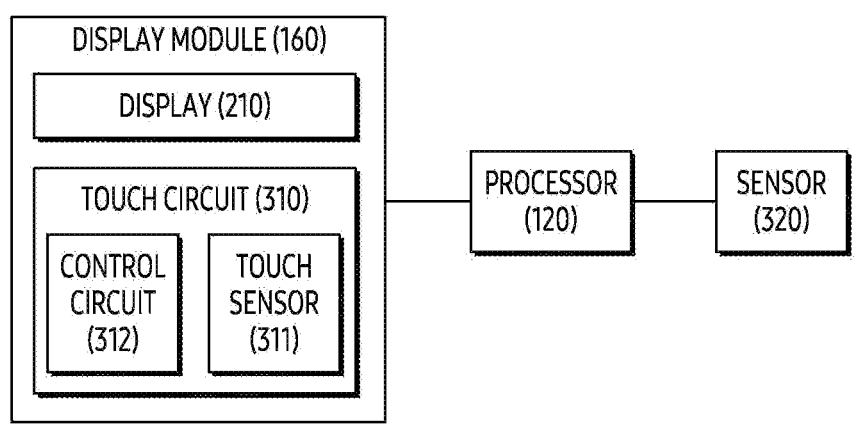
FIG. 3 is a simplified block diagram of an exemplary electronic device according to an embodiment.

FIG. 3 is a simplified block diagram of an electronic device according to an embodiment of the disclosure.

Referring to FIG. 3, an electronic device 101 according to an embodiment may include a processor 120, the display module 160 and/or a sensor 320 (e.g., a sensor module 176 of FIG. 1). The display module 160 may include a display 210 and a touch circuit 310 (e.g., a touch circuit 250 of FIG. 2). The touch circuit 310 may include a touch sensor 311 (e.g., a touch sensor 251 of FIG. 2) and/or a control circuit 312 (e.g., a touch sensor IC 253 of FIG. 2).

According to an embodiment of the disclosure, the processor 120 may control the operation of electronic components within the electronic device 101. The processor 120 may include a main processor 121 illustrated in FIG. 1 and/or an auxiliary processor 123 (e.g., a sensor hub processor). The processor 120 may be operatively coupled with the display 210, the touch sensor 311, the control circuit 312, and/or the sensor 320. That the processor 120 and at least one of the other components of the electronic device 101 are operatively coupled may mean that the other components are directly controlled or indirectly controlled by the processor 120. For example, the processor 120 may control the operation of the touch sensor 311 through the control circuit 312. For example, the processor 120 may control the operation of the display 210 through a display driving circuit (e.g., a DDI 230 of FIG. 2).

According to an embodiment, the display 210 may be configured to provide visual information. The display 210 may include a plurality of pixels for providing the visual information. The display 210 may be exposed to the outside of the electronic device 101. In addition to a function providing the visual information, the display 210 may provide a function identifying contact of an object. The display 210 may include the touch circuit 310 for identifying the contact of the object. The processor 120 may provide designated feedback based on identifying the contact of the object on the touch circuit 310 as a touch input. The contact of the object may represent that the object is directly contacted on the outer surface of the display 210 and that the object is located within a certain distance from the outer surface of the display 210. The touch circuit 310 may be disposed within the display 210. As the touch circuit 310 is included in the display 210, the display 210 may be referred to as a touch screen. The area of the display 210 where the touch circuit 310 is disposed may substantially correspond to a display area of the display 210 for displaying the visual information. However, it is not limited thereto.

According to an embodiment, the touch sensor 311 may be disposed within the display 210. The touch sensor 311 may obtain values for identifying the contact of the object on the display 210. For example, the touch sensor 311 may obtain the values representing a change in capacitance by the contact of the object.

According to an embodiment, the control circuit 312 may control the touch sensor 311. The control circuit 312 may process data on the values obtained from the touch sensor 311. For example, the control circuit 312 may generate (or obtain) other data to be provided to the processor 120 based on processing the data obtained from the touch sensor 311.

According to an embodiment, the sensor 320 may obtain data from outside the electronic device 101. The processor 120 may obtain information on the state of the electronic device 101 or the external environment of the electronic device 101 based on obtaining the data through the sensor 320. For example, the sensor 320 may include a motion sensor for obtaining data on the angle of the electronic device 101. For example, the sensor 320 may include a gyro sensor, but is not limited thereto.

For example, the touch sensor 311 may include a plurality of nodes and a plurality of lines. The plurality of nodes may form one or more rows and one or more columns. The values by the contact of the object may include a plurality of node values obtained from each of the plurality of nodes. The values by the contact of the object may include one or more line values representing each of the one or more rows and the one or more columns formed by the plurality of nodes. The node values may be referred to as mutual values. The one or more line values may be referred to as self-values. For example, an example of the plurality of nodes and the plurality of lines may be described through FIG. 4.

Figure 4:
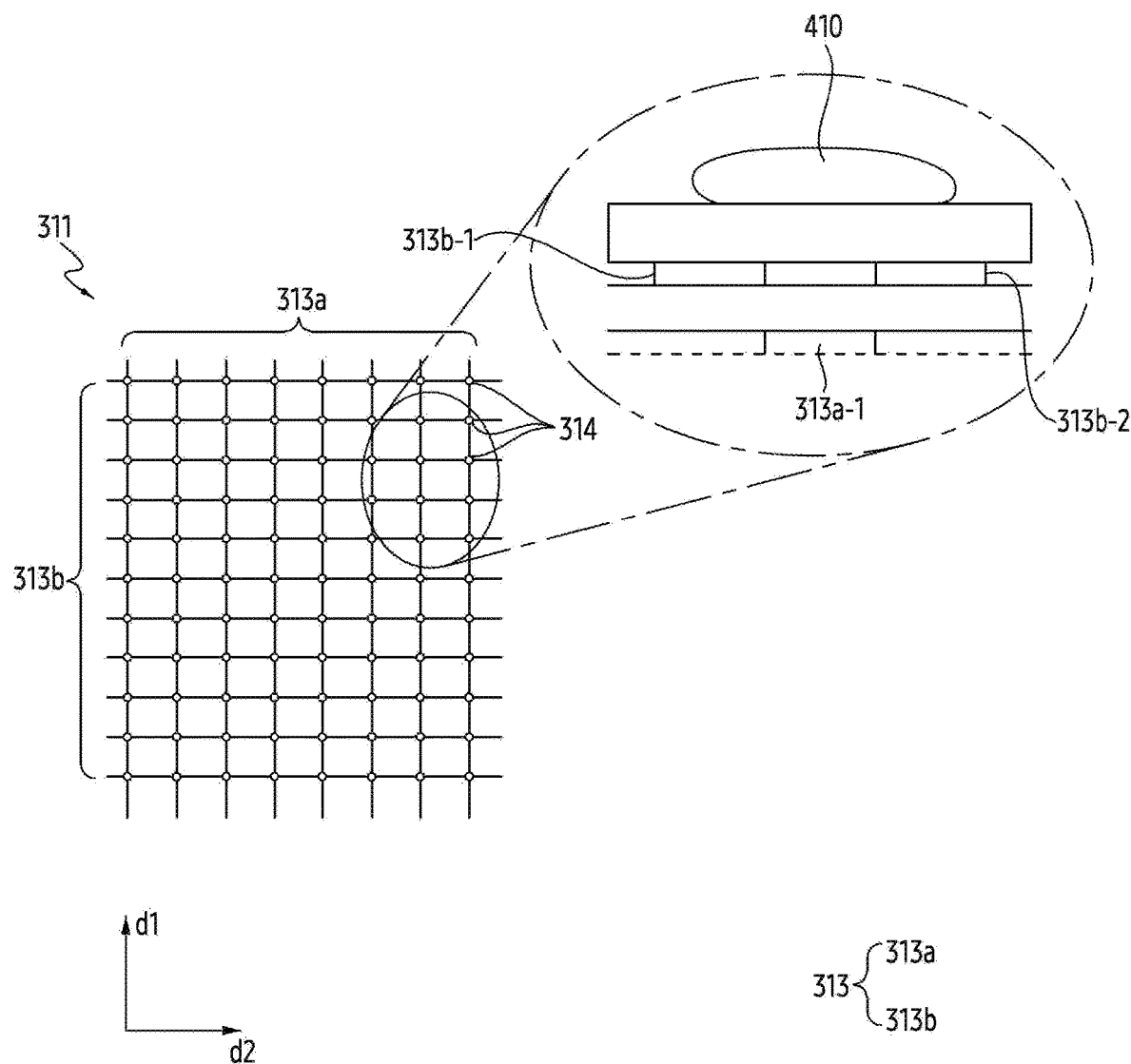
FIG. 4 schematically shows the structure of an exemplary touch sensor according to an embodiment.

FIG. 4 schematically shows the structure of an exemplary touch sensor according to an embodiment.

Referring to FIG. 4, a touch sensor 311 may include a plurality of lines 313 and a plurality of nodes 314. The plurality of lines 313 may intersect each other. According to an embodiment, the plurality of lines 313 may include a plurality of first lines 313a and a plurality of second lines 313b. The plurality of first lines 313a may extend along a first direction d1. The plurality of second lines 313b may extend along a second direction d2 different from the first direction d1. For example, the second direction d2 may be substantially perpendicular to the first direction d1, but is not limited thereto. The plurality of second lines 313b may be disposed on the plurality of first lines 313a. For example, the touch sensor 311 may include a non-conductive layer interposed between the plurality of first lines 313a and the plurality of second lines 313b. According to an embodiment, the plurality of lines 313 may be referred to as a plurality of channels or a plurality of electrodes. In case that the plurality of lines 313 are referred to as the plurality of channels, the plurality of first lines 313a may be referred to as one of the reception channel and the transmission channel, and the plurality of second lines 313b may be referred to as the other one of the reception channel and the transmission channel. For example, the plurality of lines 313 may include at least one of indium tin oxide (ITO) or antimony-doped tin oxide (ATO), but is not limited thereto.

According to an embodiment, a control circuit 312 may obtain a plurality of line values through the plurality of lines 313. For example, the control circuit 312 may obtain a capacitance value of each of the plurality of lines 313, for an electrical ground. Each of the plurality of line values corresponding to each of the plurality of lines 313 may represent characteristics of each of the plurality of lines 313. The control circuit 312 may identify contact on the touch sensor 311 based on the plurality of line values. For example, the control circuit 312 may identify hovering on the touch sensor 311 based on the plurality of line values. For example, a sensing method in which the control circuit 312 utilizes the plurality of line values may be referred to as a self-capacitance method.

According to an embodiment, the plurality of nodes 314 may be formed (or defined) by the plurality of lines 313. For example, the plurality of nodes 314 may be located at a point where the plurality of lines 313 intersect. For example, the plurality of nodes 314 may be located at a position where the plurality of first lines 313a and the plurality of second lines 313b intersect.

According to an embodiment, the control circuit 312 may obtain a plurality of node values through the plurality of nodes 314. For example, the control circuit 312 may obtain the plurality of node values based on a change in capacitance between the plurality of first lines 313a and the plurality of second lines 313b. The control circuit 312 may identify the position of the node corresponding to the node value exceeding the threshold value as the user's touch position, based on identifying the node value exceeding the threshold value among the plurality of node values. For example, a sensing method in which the control circuit 312 utilizes the plurality of node values may be referred to as a mutual-capacitance method.

For example, in case that a fluid 410 (e.g., moisture) is contacted on the touch sensor 311, since the fluid 410 may have conductivity, the plurality of node values in the touch sensor 311 may be changed. Since the control circuit 312 identifies the user's intended touch input based on changes in the plurality of node values, the fluid 410 on the touch sensor 311 may cause malfunction of the control circuit 312. For example, in case that the fluid 410 on the touch sensor 311 is located on a line 313b-1 and a line 313b-2, the capacitance value between the line 313b-1 and the line 313a-1 and the capacitance value between the line 313b-2 and the line 313a-1 are changed by the fluid 410, and thus distortion of the plurality of node values may occur. Since the distortion of the plurality of node values is caused by the fluid 410, in case that the user's intended touch input is transmitted in a state where the fluid 410 is contacted on the touch sensor 311, the touch position of the user's intended touch input may be distorted. Hereinafter, a method which is capable of reducing malfunction of the control circuit 312 by the fluid 410 and distortion of the position of a touch input by the fluid 410 will be described. Meanwhile, hereinafter, operations of the electronic device 101 will be described based on the processor 120, but some of the operations below may be performed through the control circuit 312. For example, the operation of reducing the malfunction of the control circuit 312 by the fluid 410 may be described through FIGS. 5A, 5B, and 5C.

Figure 5A:
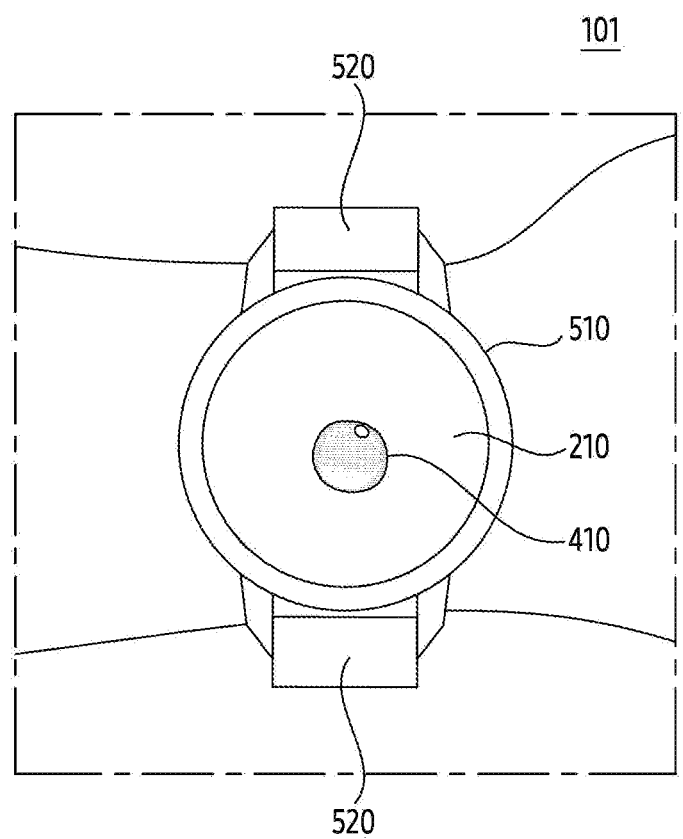
FIG. 5A shows an example of a state in which a fluid is contacted on an exemplary touch sensor according to an embodiment.

FIG. 5A shows an example of a state in which a fluid is contacted on an exemplary touch sensor according to an embodiment.

FIG. 5B shows an example of a plurality of node values in a state in which a fluid is contacted on an exemplary touch sensor according to an embodiment.

FIG. 5C shows an example of a plurality of node values in a state in which a fluid is contacted on an exemplary touch sensor according to an embodiment.

Referring to FIGS. 5A, 5B, and 5C, according to an embodiment, an electronic device 101 may further include a supporting member 510 and a plurality of straps 520. Hereinafter, the electronic device 101 will be described as having the form of a wearable device worn by the user, but the form of the electronic device 101 is not limited thereto.

According to an embodiment, the supporting member 510 may support a display 210. The display 210 may be disposed on the supporting member 510. The display 210 may be exposed to the outside of the electronic device 101 in a state that it is coupled to the supporting member 510. For example, the supporting member 510 may include a conductive material. In case that the supporting member 510 includes the conductive material, the supporting member 510 may provide an electrical ground. The supporting member 510 may contact a portion of the user's body when the electronic device 101 is worn by the user.

According to an embodiment, the plurality of straps 520 may be coupled to be movable with respect to the supporting member 510. For example, the plurality of straps 520 may be coupled to be rotatable with respect to the supporting member 510. The plurality of straps 520 may be in contact with a portion of the user's body when the electronic device 101 is worn by the user. As the plurality of straps 520 are in contact with a portion of the user's body, the position of the electronic device 101 may be maintained, in a state where the electronic device 101 is worn by the user.

According to an embodiment, a processor (e.g., a processor 120 of FIG. 3) may obtain a plurality of node values 530 and 540 obtained from each of a plurality of nodes (e.g., a plurality of nodes 314 of FIG. 4). For example, the plurality of node values 530 and 540 may be obtained frame by frame according to the frequency set for displaying an image on the display 210. For example, the processor 120 may obtain the plurality of node values 530 and 540 obtained by a fluid 410 from each of the plurality of nodes (e.g., the plurality of nodes 314 of FIG. 4). The processor 120 may identify patterns 531 and 541 by the plurality of node values 530 and 540 representing the fluid 410 on a touch sensor 311 based on obtaining the plurality of node values 530 and 540. For example, referring to FIG. 5B, the processor 120 may obtain the plurality of node values 530. At least some of the plurality of node values 530 may be caused by the fluid 410 on the touch sensor 311. The position of the pattern 531 may correspond to the position of the fluid 410 on the touch sensor 311. The pattern 531 may include at least one node value 531a having a negative value and a plurality of node values 531b having a positive value. The plurality of node values 531b may at least partially surround (or cover) the at least one node value 531a. The processor 120 may identify that the fluid 410 is contacted on the touch sensor 311, based on a pattern 531, which includes the at least one node value 531a having the negative value and a plurality of node values 531b having the positive value and at least partially surrounding (or cover) the at least one node value 531a. For example, referring to FIG. 5C, the processor 120 may obtain a plurality of node values 540. At least some of the plurality of node values 540 may be caused by the fluid 410 on the touch sensor 311. The position of the pattern 541 may correspond to the position of the fluid 410 on the touch sensor 311. The pattern 541 may include at least one node value 541a having the negative value and a plurality of node values 541b having the positive value. The plurality of node values 541b may surround (or wrap) the at least one node value 541a. For example, the plurality of node values 541b may completely surround (or wrap) the at least one node value 541a. For example, the plurality of node values 541b may completely enclose the at least one node value 541a. The processor 120 may identify that the fluid 410 is contacted on the touch sensor 311, based on the pattern 541 including the at least one node value 541a having the negative value and the plurality of node values 541b having the positive value and surrounding (or wrapping) the at least one node value 541a.

According to an embodiment, the operation in which the processor 120 identifies the patterns 531 and 541 may be performed based on a neural network. For example, the neural network may be pre-trained before the plurality of node values 530 and 540 are obtained. For example, the processor 120 may identify whether the patterns 531 and 541 are caused by the fluid 410 based on inputting the plurality of node values 530 and 540 into the neural network.

According to an embodiment, the processor 120 may identify the amount of the fluid 410 of the touch sensor 311 based on the distribution of node values in the patterns 531 and 541. For example, the processor 120 may identify that the amount of the fluid 410 when the pattern 541 in which the plurality of node values 541b fully surround the at least one node value 541a is identified is greater than the amount of the fluid 410 when the pattern 531 in which the plurality of node values 531b partially surround the at least one node value 531a is identified.

According to an embodiment, the processor 120 may reduce sensitivity of the touch sensor 311 based on identifying the patterns 531 and 541 by the plurality of node values 530 and 540 representing the fluid on the touch sensor 311. For example, the processor 120 may identify whether the patterns 531 and 541 are identified by the plurality of node values 530 and 540 during a designated time. The processor 120 may reduce the touch sensitivity of the touch sensor 311 based on that the patterns 531 and 541 are identified by the plurality of node values 530 and 540 during the designated time. For example, the processor 120 may change the touch sensitivity of the touch sensor 311 from a first touch sensitivity to a second touch sensitivity based on identifying the patterns 531 and 541 by the plurality of node values 530 and 540 during a designated number of frames. For example, the designated number of frames may represent 5 frames. For example, the processor 120 may change the touch sensitivity of the touch sensor 311 from the first touch sensitivity to the second touch sensitivity lower than the first touch sensitivity based on identifying patterns 531 and 541 by the plurality of node values 530 and 540 representing the fluid 410 on the touch sensor 311. For example, the processor 120 may change the state of the electronic device 101 to a first state in which the touch sensitivity of the touch sensor 311 is the second touch sensitivity, based on identifying the patterns 531 and 541 by the plurality of node values 530 and 540 representing the fluid 410 on the touch sensor 311. The first state may be referred to as a first water mode. As the touch sensitivity of the touch sensor 311 is higher, a contact corresponding to a relatively lower value than the case that the touch sensitivity is lower may be identified as a touch input. The touch sensitivity of the touch sensor 311 may be set based on a threshold value. For example, the processor 120 (or a control circuit 312) may identify whether to recognize the contact on the touch sensor 311 as the touch input through comparing at least some of the plurality of node values 530 and 540 with a first threshold value in the first touch sensitivity. The processor 120 (or the control circuit 312) may identify the contact on the touch sensor 311 as the touch input based on that at least some of the plurality of node values 530 and 540 exceed the first threshold value in the first touch sensitivity. The processor 120 (or the control circuit 312) may refrain (or bypass) from identifying the contact on the touch sensor 311 as the touch input based on that each of the plurality of node values 530 and 540 is less than the first threshold value in the first touch sensitivity. The processor 120 (or the control circuit 312) may identify whether to recognize the contact on the touch sensor 311 as the touch input through comparing at least some of the plurality of node values 530 and 540 with a second threshold value higher than the first threshold value, in a second touch sensitivity lower than the first touch sensitivity. The processor 120 (or the control circuit 312) may identify the contact on the touch sensor 311 as the touch input based on that at least some of the plurality of node values 530 and 540 exceed the second threshold value, in the second touch sensitivity. The processor 120 (or the control circuit 312) may refrain (or bypass) from identifying the contact on the touch sensor 311 as the touch input based on that each of the plurality of node values 530 and 540 is less than the second threshold value, in the second touch sensitivity. For example, the processor 120 (or the control circuit 312) may identify the contact that caused the input as the touch input, based on obtaining values corresponding to the input caused from a conductive rod having a diameter of approximately 6 mm or more in a non-ground state, in the second touch sensitivity.

As described above, the electronic device 101 according to an embodiment may provide a method of identifying the fluid 410 on the touch sensor 311 based on identifying the patterns 531 and 541 by the plurality of node values 530 and 540. The electronic device 101 according to an embodiment may provide a method of reducing malfunction of the touch sensor 311 by reducing the touch sensitivity based on identifying the patterns 531 and 541 by the plurality of node values 530 and 540 representing the fluid 410 on the touch sensor 311. For example, in addition to the change of the plurality of node values 530 and 540 by the user's body, the plurality of node values 530 and 540 may also be changed by the fluid 410. In case that the processor 120 (or the control circuit 312) identifies the change of the plurality of node values 530 and 540 by the fluid 410 as the touch input, the malfunction of the touch sensor 311 may occur. Since the change of the plurality of node values 530 and 540 by the fluid 410 is smaller than the change of the plurality of node values 530 and 540 by the body, the electronic device 101 according to an embodiment may provide the method of reducing the malfunction of the touch sensor 311 by reducing the touch sensitivity in response to identifying the fluid 410 on the touch sensor 311.

Referring again to FIG. 3, as the electronic device 101 is carried by the user, the fluid 410 may move on the touch sensor 311. The malfunction of the touch sensor 311 may be caused by the change of the plurality of node values by the fluid 410 on the touch sensor 311. Hereinafter, a method which is capable of reducing the malfunction of the touch sensor 311 by movement of the fluid 410 may be described through FIGS. 6 and 7.

Figure 6:
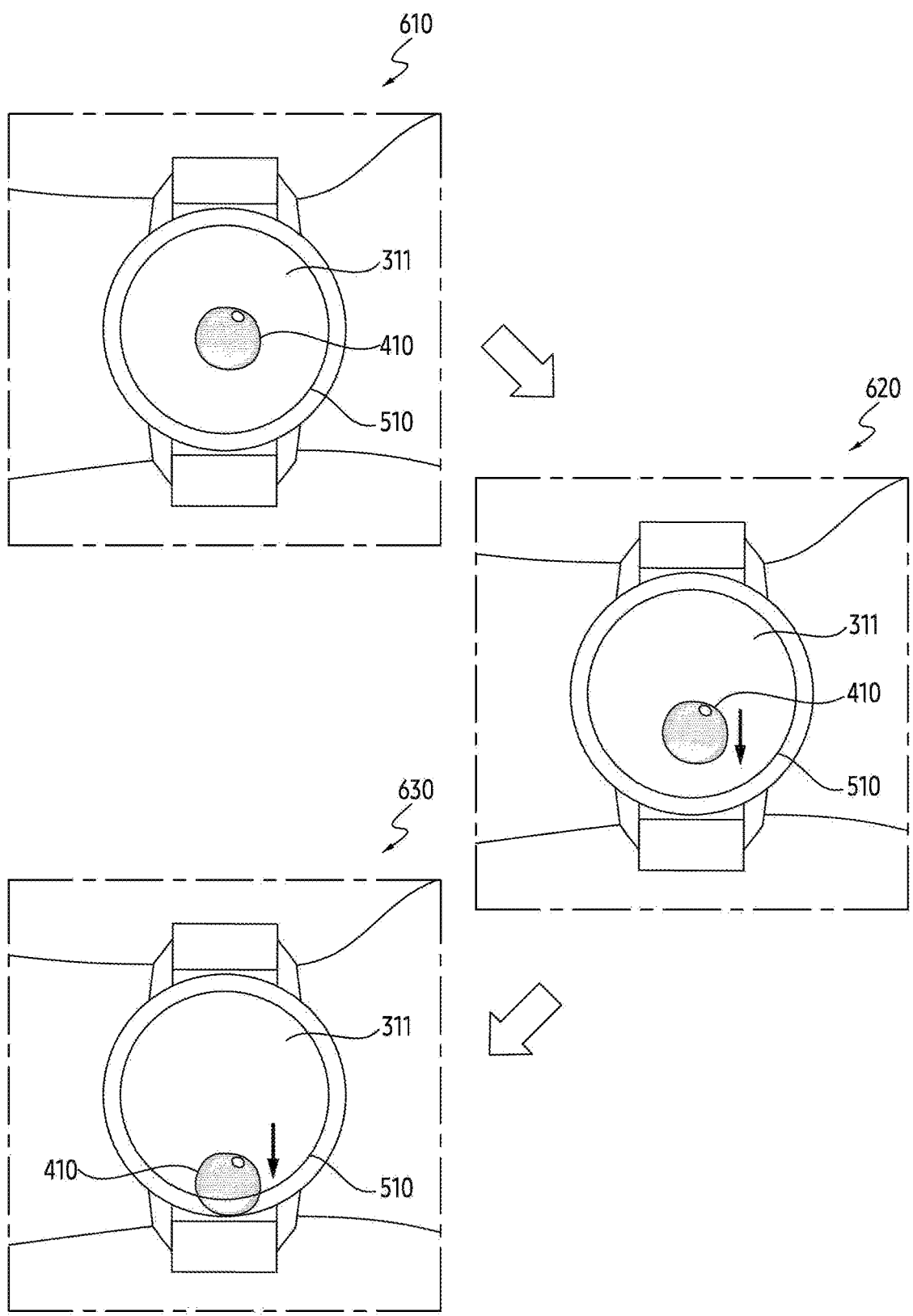
FIG. 6 shows an example in which a fluid moves on an exemplary touch sensor according to an embodiment.

FIG. 6 shows an example in which a fluid moves on an exemplary touch sensor according to an embodiment.

Figure 7:
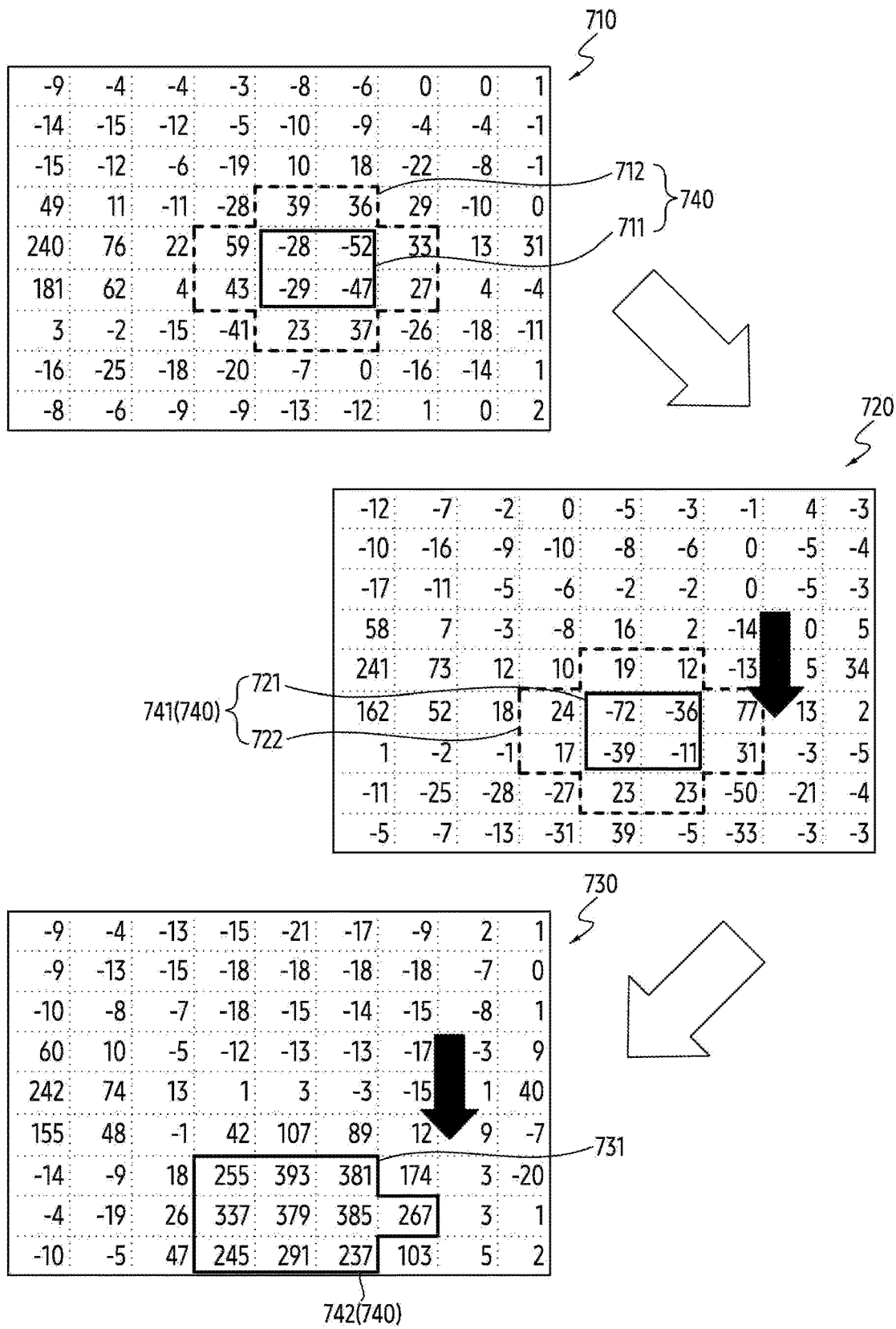
FIG. 7 shows an example of a plurality of node values in a state in which a fluid moves on an exemplary touch sensor according to an embodiment.

FIG. 7 shows an example of a plurality of node values in a state in which a fluid moves on an exemplary touch sensor according to an embodiment.

FIG. 7 shows a plurality of node values 710, 720, and 730 corresponding to each of the states 610, 620, and 630 of FIG. 6. For example, the plurality of node values 710 may correspond to the state 610, the plurality of node values 720 may correspond to the state 620, and the plurality of node values 730 may correspond to the state 630.

Referring to FIGS. 6 and 7, a fluid 410 may move on a touch sensor 311. For example, in the state 610, an electronic device 101 may be inclined. As the electronic device 101 is inclined, in the state 620, the fluid 410 may move on the touch sensor 311. The fluid 410 may move on the touch sensor 311 by gravity acting on the fluid 410. In the state 630, the fluid 410 may be in contact with a supporting member 510 by moving on the touch sensor 311. For example, in the state 630, a portion of fluid 410 may be located on the touch sensor 311 and another portion of fluid 410 may be in contact with supporting member 510.

According to an embodiment, the processor 120 may identify a pattern 740 by the plurality of node values 710. For example, the processor 120 may identify the pattern 740 by the plurality of node values 710 representing the fluid 410 on the touch sensor 311. The pattern 740 may correspond to at least one of a pattern 531 of FIG. 5B and a pattern 541 of FIG. 5C. For example, the pattern 740 may include at least one node value 711 having a negative value, and a plurality of node values 712 having a positive value and at least partially surrounding (or wrapping) the at least one node value 711. The pattern 740 may be defined (or formed) by the at least one node value 711 and the plurality of node values 712. The processor 120 may change the touch sensitivity of the touch sensor 311 from a first touch sensitivity to a second touch sensitivity lower than the first touch sensitivity, based on identifying the pattern 740 representing the fluid 410 on the touch sensor 311. For example, the processor 120 may change a state of the electronic device 101 to a first state in which the touch sensitivity of the touch sensor 311 is the second touch sensitivity, based on identifying the pattern 740 representing the fluid 410 on the touch sensor 311.

According to an embodiment, the processor 120 may identify whether the angle of the electronic device 101 is within a designated angle range, through a sensor (e.g., a sensor 320 of FIG. 3). For example, the designated angle range may be approximately 20 degrees to approximately 340 degrees, but is not limited thereto. For example, the processor 120 may identify that the electronic device 101 is in a state that it is worn by the user based on that the angle of the electronic device 101 is within the designated angle range through the sensor 320. For example, the processor 120 may identify that the electronic device 101 is in a state that it is not worn by the user based on that the angle of the electronic device 101 is outside the designated angle range through the sensor 320.

According to an embodiment, the processor 120 (or a control circuit 312) may identify movement of the fluid 410 on the touch sensor 311. For example, the processor 120 may identify a change in the pattern 740 based on that the angle of the electronic device 101 identified through the sensor 320 is within the designated angle range. For example, the processor 120 may refrain (or bypass) from identifying a change in the pattern 740 based on that the angle of the electronic device 101 identified through the sensor 320 is outside the designated angle. However, it is not limited thereto. For example, the processor 120 may identify the change in the pattern 740 based on that the angle of the electronic device 101 is outside the designated angle. The processor 120 may identify the change in the pattern 740 by the plurality of node values 710, 720, and 730. For example, the change in the pattern 740 may represent the movement of the fluid 410 on the touch sensor 311. For example, the change in the pattern 740 may represent that the amount of fluid 410 on the touch sensor 311 is relatively large. The processor 120 may identify the change in the pattern 740 through the plurality of node values 720 obtained after the plurality of node values 710 are obtained. For example, processor 120 may identify movement of the pattern 740. The movement of the pattern 740 may represent the movement of the fluid 410 on the touch sensor 311. The change in the pattern 740 may be caused by the movement of the fluid 410 on the touch sensor 311. For example, the pattern 740 may move along the direction of the movement of the fluid 410 on the touch sensor 311.

According to an embodiment, the processor 120 may identify the change in the pattern 740 through the plurality of node values 730 obtained after the plurality of node values 720 are obtained. For example, the processor 120 may identify the movement of the pattern 740 through the plurality of node values 730. For example, the processor 120 may identify that the pattern 740 changes from a first pattern 741 to a second pattern 742 through the plurality of node values 730. The first pattern 741 may include at least one node value 721 having the negative value and a plurality of node values 722 having the positive value and at least partially surrounding (wrapping) the at least one node value 721. The first pattern 741 may include the at least one node value 721 having the negative value within the state 620 in which the fluid 410 is spaced apart from the supporting member 510 and a plurality of second node values 722 having the positive value and surrounding the at least one node value 721. The second pattern 742 may include a plurality of node values 731 having a positive value exceeding the reference value. The second pattern 742 may have a positive value only. The second pattern 742 may include the plurality of node values 731 having the positive value in the state 630 in which at least a portion of the fluid 410 is in contact with the supporting member 510. For example, the reference value may correspond to a value generally utilized when the processor 120 (or the control circuit 312) identifies a touch input through the plurality of node values 731. For example, the reference value may correspond to a value generally utilized when the processor 120 (or the control circuit 312) identifies the touch input according to a mutual-capacitance method. According to an embodiment, an operation in which the processor 120 identifies the change in the pattern 740 may be performed based on a neural network. For example, the neural network may be pre-trained before the plurality of node values 710, 720, and 730 are obtained. For example, the processor 120 may identify the change in the pattern 740 representing the movement of the fluid 410 based on inputting the plurality of node values 710, 720, and 730 into the neural network.

According to an embodiment, the processor 120 may identify whether to recognize a contact on the touch sensor 311 as the touch input through a plurality of line values obtained from each of a plurality of lines (e.g., a plurality of lines 313 of FIG. 4), based on identifying the change in the pattern 740 representing the movement of the fluid 410 on the touch sensor 311. For example, the processor 120 may identify whether to recognize the contact on the touch sensor 311 as the touch input through the plurality of line values, based on that the angle of the electronic device 101 identified through the sensor 320 is within the designated angle range and identifying the change in the pattern 740. For example, the processor 120 may change the state of the electronic device 101 from the first state to a second state that identifies the touch input through the plurality of line values, based on identifying the change in the pattern 740 representing the movement of the fluid 410 on the touch sensor 311. The second state may be referred to as a second water mode. For example, the processor 120 may identify whether to recognize the contact on the touch sensor 311 as the touch input according to a self-capacitance method using the plurality of line values obtained from each of the plurality of lines 313, based on identifying the change in the pattern 740. For example, the processor 120 may change the state of the electronic device 101 from the first state utilizing the mutual-capacitance method and the self-capacitance method to the second state utilizing the self-capacitance method only, based on identifying the change in the pattern 740. For example, the processor 120 may refrain (or bypass) from identifying whether to recognize the contact of the touch sensor 311 as the touch input through the plurality of node values 710, 720, and 730, based on identifying the change in the pattern 740. For example, the processor 120 may cease identifying whether to recognize the contact on the touch sensor 311 as the touch input through the plurality of node values 710, 720, and 730, based on identifying the change in the pattern 740. For example, the processor 120 may refrain (or bypass) from identifying whether to recognize the contact on the touch sensor 311 as the touch input according to the mutual-capacitance method, and may identify whether to recognize the contact on the touch sensor 311 as the touch input according to the self-capacitance method, based on identifying the change in the pattern 740.

According to an embodiment, the processor 120 may identify whether to recognize the contact on the touch sensor 311 as the touch input through the plurality of line values, based on identifying the change in the pattern 740 representing the movement of the fluid 410 on the touch sensor 311, during a designated time. For example, the designated time may be set (or changed) by the user, but is not limited thereto. The processor 120 may identify that the electronic device 101 is exposed to a relatively large amount of water, based on identifying the change in the pattern 740 representing the movement of the fluid 410. For example, the change in the pattern 740 representing the movement of the fluid 410 may be caused when the user of the electronic device 101 is in the shower. For example, the change in the pattern 740 representing the movement of the fluid 410 may be caused when the user of the electronic device 101 is swimming. For example, the change in the pattern 740 representing the movement of the fluid 410 may be caused when the electronic device 101 is exposed to rain. For example, unlike in case that a relatively small amount of the fluid 410 is located on the touch sensor 311, in case that a relatively large amount of the fluid 410 is located on the touch sensor 311, the movement of the fluid 410 by the gravity may become smooth. The processor 120 may identify that the relatively large amount of the fluid 410 is located on the touch sensor 311 through the change in the pattern 740. Since the change in the plurality of line values by the fluid 410 is relatively smaller than the change in the plurality of node values 710, 720, and 730 by the fluid 410, the processor 120 may identify whether to recognize the contact on the touch sensor 311 as the touch input through the plurality of line values, based on identifying the change in the pattern 740 representing the movement of the fluid 410 in order to reduce malfunction of the touch sensor 311.

As described above, since the electronic device 101 according to an embodiment identifies whether to recognize the contact on the touch sensor 311 as the touch input through the plurality of line values based on the change in the pattern 740 representing the movement of the fluid 410, a method which is capable of reducing the malfunction of the touch sensor 311 may be provided.

Referring again to FIG. 3, according to an embodiment, the processor 120 (or the control circuit 312) may identify whether to recognize the contact on the touch sensor 311 as the touch input, based on comparing the reference line value with the plurality of line values obtained through the plurality of lines (e.g., the plurality of lines 313 of FIG. 4). Since the change in the plurality of line values by the fluid 410 is relatively smaller than the change in the plurality of node values by the fluid 410, the processor 120 (or the control circuit 312) may reduce the malfunction of the touch sensor 311 by identifying the touch input through the plurality of line values. For example, the distribution of the plurality of line values obtained as the relationship between the electronic device 101 and the fluid 410 changes may be described through FIGS. 8A, 8B, 9A, 9B, 10A, 10B, 11A, and 11B.

Figure 8A:
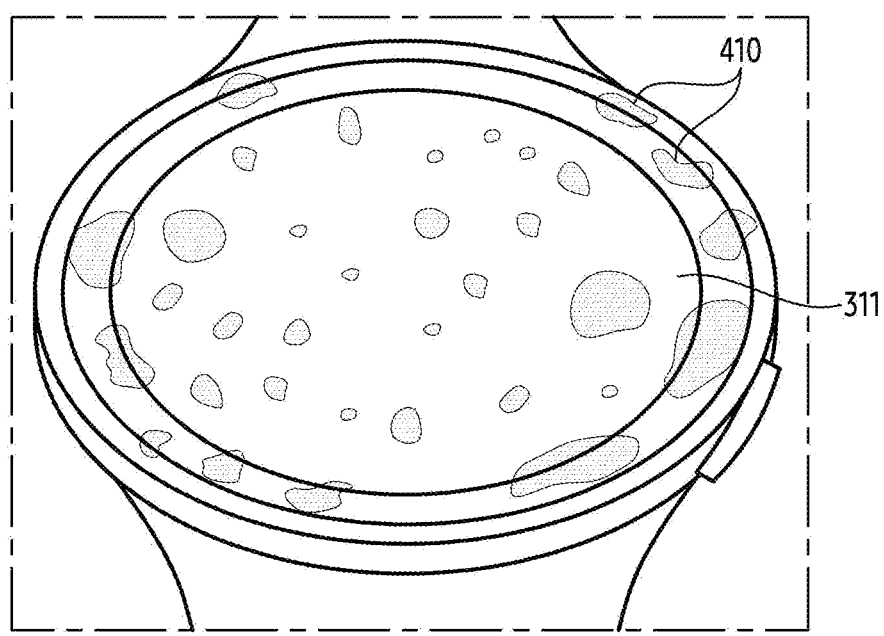
FIG. 8A shows an example in which a fluid is contacted on an exemplary touch sensor according to an embodiment.

FIG. 8A shows an example in which a fluid is contacted on an exemplary touch sensor according to an embodiment.

Figure 8B:
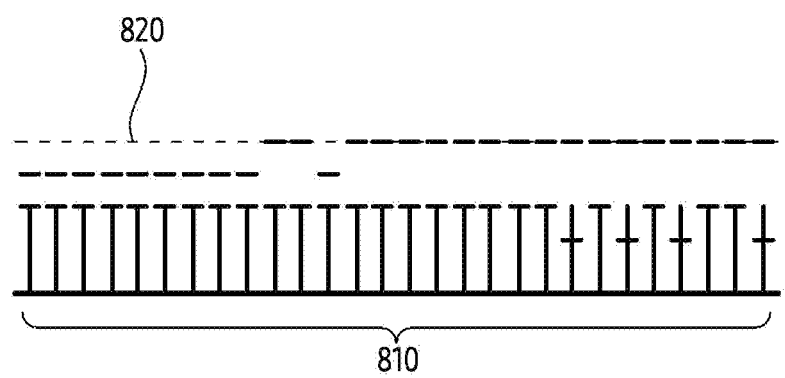
FIG. 8B is a graph showing an example of line values obtained from a touch sensor in FIG. 8A.

FIG. 8B is a graph showing an example of line values obtained from a touch sensor in FIG. 8A.

In the graph of FIG. 8B, the horizontal axis represents each of a plurality of lines (e.g., a plurality of lines 313 of FIG. 4), and the vertical axis represents the size of each of a plurality of line values 810 obtained from each of the plurality of lines 313.

Referring to FIG. 8A, a contact on a touch sensor 311 may be caused by a fluid 410 on the touch sensor 311. The fluid 410 may be located in a dispersed form on the touch sensor 311. For example, the fluid 410 may include droplets that have a relatively small volume and are in the dispersed form, on the touch sensor 311.

Referring to FIG. 8B, in a second state of the electronic device 101, a processor 120 (or a control circuit 312) may identify whether to recognize the contact on the touch sensor 311 as a touch input, through comparing each of the plurality of line values 810 with a reference line value 820. The processor 120 (or the control circuit 312) may refrain from (or bypass) identifying the contact on the touch sensor 311 as the touch input based on that each of the plurality of line values 810 is less than or equal to the reference line value 820.

Figure 9A:
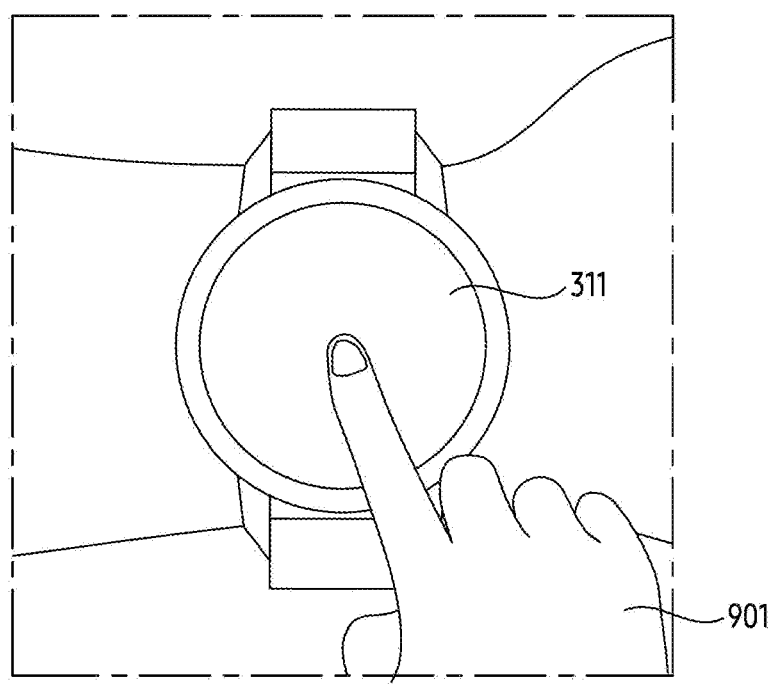
FIG. 9A shows an example in which a body is contacted on an exemplary touch sensor according to an embodiment.

FIG. 9A shows an example in which a body is contacted on an exemplary touch sensor according to an embodiment.

Figure 9B:
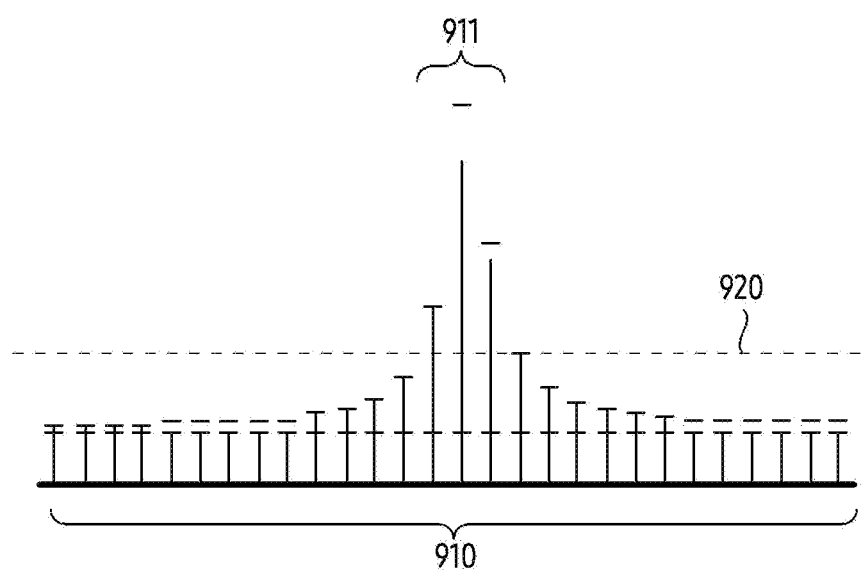
FIG. 9B is a graph showing an example of line values obtained from a touch sensor in FIG. 9A.

FIG. 9B is a graph showing an example of line values obtained from a touch sensor in FIG. 9A.

In the graph of FIG. 9B, the horizontal axis represents each of a plurality of lines (e.g., a plurality of lines 313 of FIG. 4), and the vertical axis represents the size of each of a plurality of line values 910 obtained from each of the plurality of lines 313.

Referring to FIGS. 9A and 9B, a contact on a touch sensor 311 may be caused by a body 901. The contact on the touch sensor 311 may only be caused by the body 901 except for a fluid (e.g., a fluid 410 of FIG. 4). The fluid 410 may be removed on the touch sensor 311. In a second state of an electronic device 101, a processor 120 (or a control circuit 312) may identify whether to recognize the contact on the touch sensor 311 as a touch input by comparing each of the plurality of line values 910 with a reference line value 920. The processor 120 (or the control circuit 312) may identify the contact on the touch sensor 311 as the touch input based on that some 911 of the plurality of line values 910 exceeds the reference line value 920. The processor 120 may provide designated feedback corresponding to the touch input based on identifying the contact on the touch sensor 311 as the touch input.

Figure 10A:
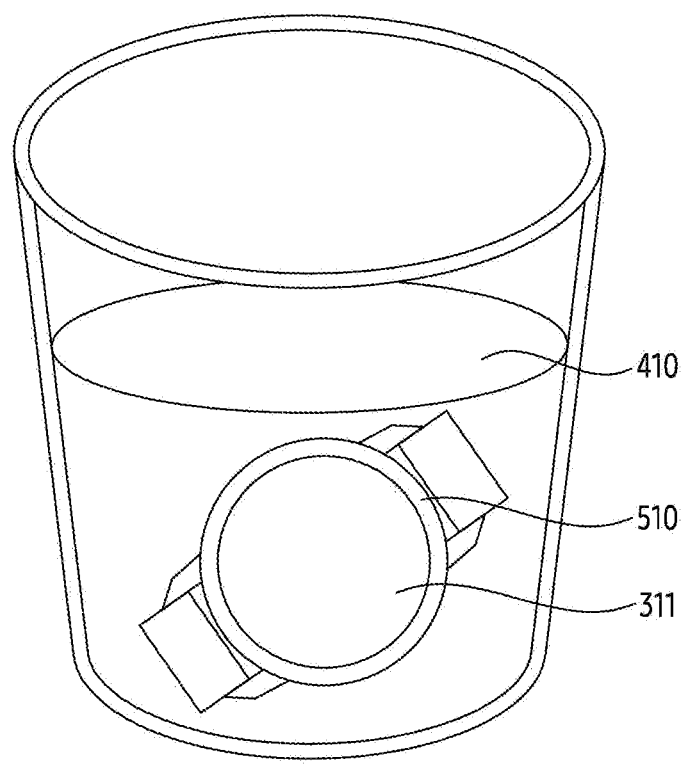
FIG. 10A shows an example in which a fluid is contacted on an exemplary touch sensor according to an embodiment.

FIG. 10A shows an example in which a fluid is contacted on an exemplary touch sensor according to an embodiment.

Figure 10B:
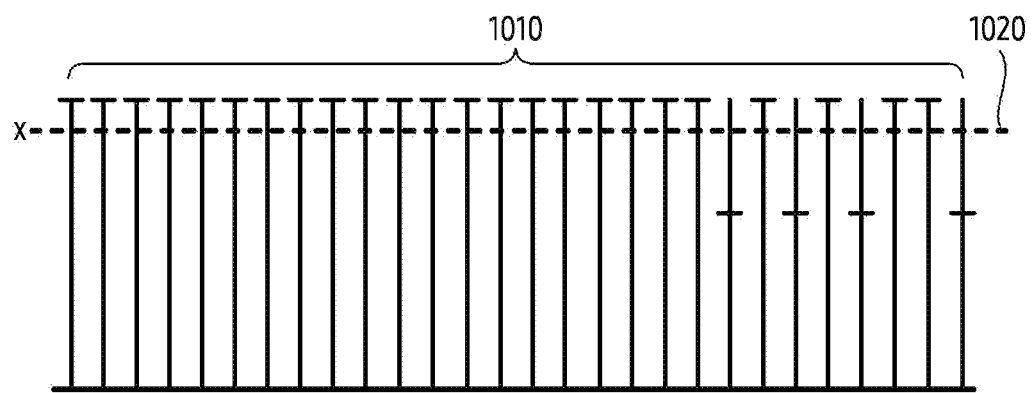
FIG. 10B is a graph showing an example of line values obtained from a touch sensor in FIG. 10A.

FIG. 10B is a graph showing an example of line values obtained from a touch sensor in FIG. 10A.

In the graph of FIG. 10B, the horizontal axis represents each of a plurality of lines (e.g., a plurality of lines 313 of FIG. 4), and the vertical axis represents the size of each of a plurality of line values 1010 obtained from each of the plurality of lines 313.

Referring to FIG. 10A, a contact on a touch sensor 311 may be caused by a fluid 410 at least partially surrounding (or wrapping) the touch sensor 311. The fluid 410 may be contacted on the touch sensor 311. For example, the fluid 410 may completely surround the entire area of the touch sensor 311. For example, a relatively large amount of fluid 410 may be placed on the touch sensor 311. A supporting member 510 and the touch sensor 311 may be electrically connected by the relatively large amount of fluid 410.

Referring to FIG. 10B, all of the plurality of line values 1010 obtained in a state where the supporting member 510 and the touch sensor 311 are electrically connected may exceed a reference line value 1020. The processor 120 (or the control circuit 312) may refrain from (or bypass) identifying a contact on the touch sensor 311 as a touch input, through the plurality of line values 1010 and a plurality of node values obtained from a plurality of nodes (e.g., a plurality of nodes 314 of FIG. 4). For example, the processor 120 (or the control circuit 312) may identify that the contact on the touch sensor 311 is caused by the supporting member 510 and the fluid 410 electrically connected to the touch sensor 311, based on that all of the plurality of line values 1010 exceeds the reference line value 1020 and the plurality of node values exceeds the reference node value. The processor 120 (or the control circuit 312) may refrain from (or bypass) identifying the contact on the touch sensor 311 as the touch input, based on that all of the plurality of line values 1010 exceeds the reference line value 1020 and the plurality of node values exceeds the reference node value.

Figure 11A:
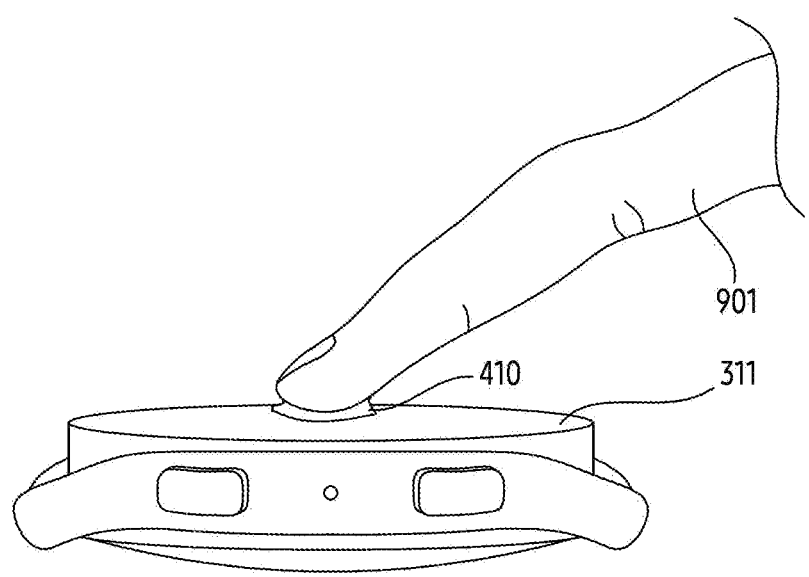
FIG. 11A shows an example in which a fluid and a body are contacted on an exemplary touch sensor according to an embodiment.

FIG. 11A shows an example in which a fluid and a body are contacted on an exemplary touch sensor according to an embodiment.

Figure 11B:
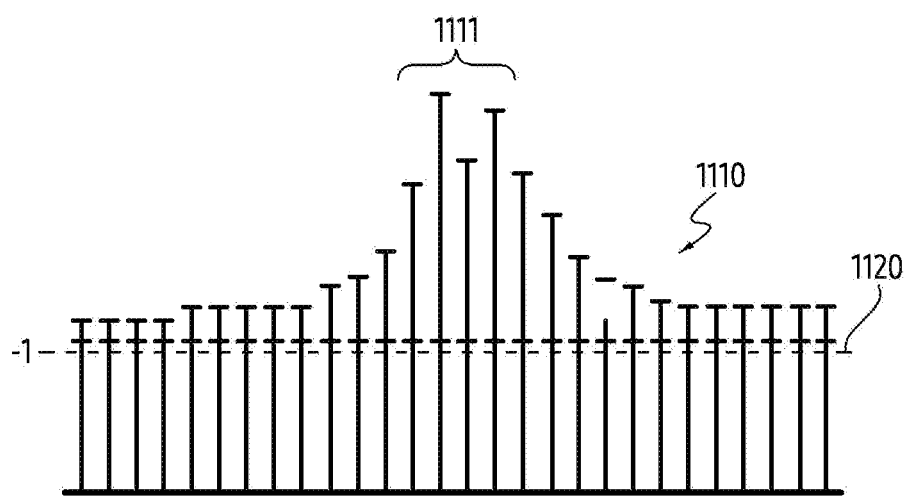
FIG. 11B is a graph showing an example of line values obtained from a touch sensor in FIG. 11A.

FIG. 11B is a graph showing an example of line values obtained from a touch sensor in FIG. 11A.

In the graph of FIG. 11B, the horizontal axis represents each of a plurality of lines (e.g., a plurality of lines 313 of FIG. 4), and the vertical axis represents the size of each of a plurality of line values 1110 obtained from each of the plurality of lines 313.

Referring to FIGS. 11A and 11B, a contact on a touch sensor 311 may be caused by a body 901 containing a fluid 410. The body 901 containing the fluid 410 may be contacted on the touch sensor 311. A processor 120 (or a control circuit 312) may identify whether to recognize the contact on the touch sensor 311 as a touch input, through comparing each of the plurality of line values 1110 with the reference line value 1120. For example, the processor 120 may identify the contact on the touch sensor 311 as the touch input, based on that some 1111 of the plurality of line values 1110 exceed the reference line value 1120. In case that a contact by the body 901 containing the fluid 410 is caused on the touch sensor 311, the position of the contact identified by the processor 120 (or the control circuit 312) may be distorted by the fluid 410. For example, the position of the contact identified by a plurality of node values representing the contact by the body 901 containing the fluid 410 may be different from the position of the body 901 on the touch sensor 311. For example, whether the contact on the touch sensor 311 was caused by the body 901 containing the fluid 410 may be identified through a neural network. The operation of compensating for the distortion of the position of the contact by the fluid 410 may be explained through FIGS. 12A to 12C.

Figure 12A:
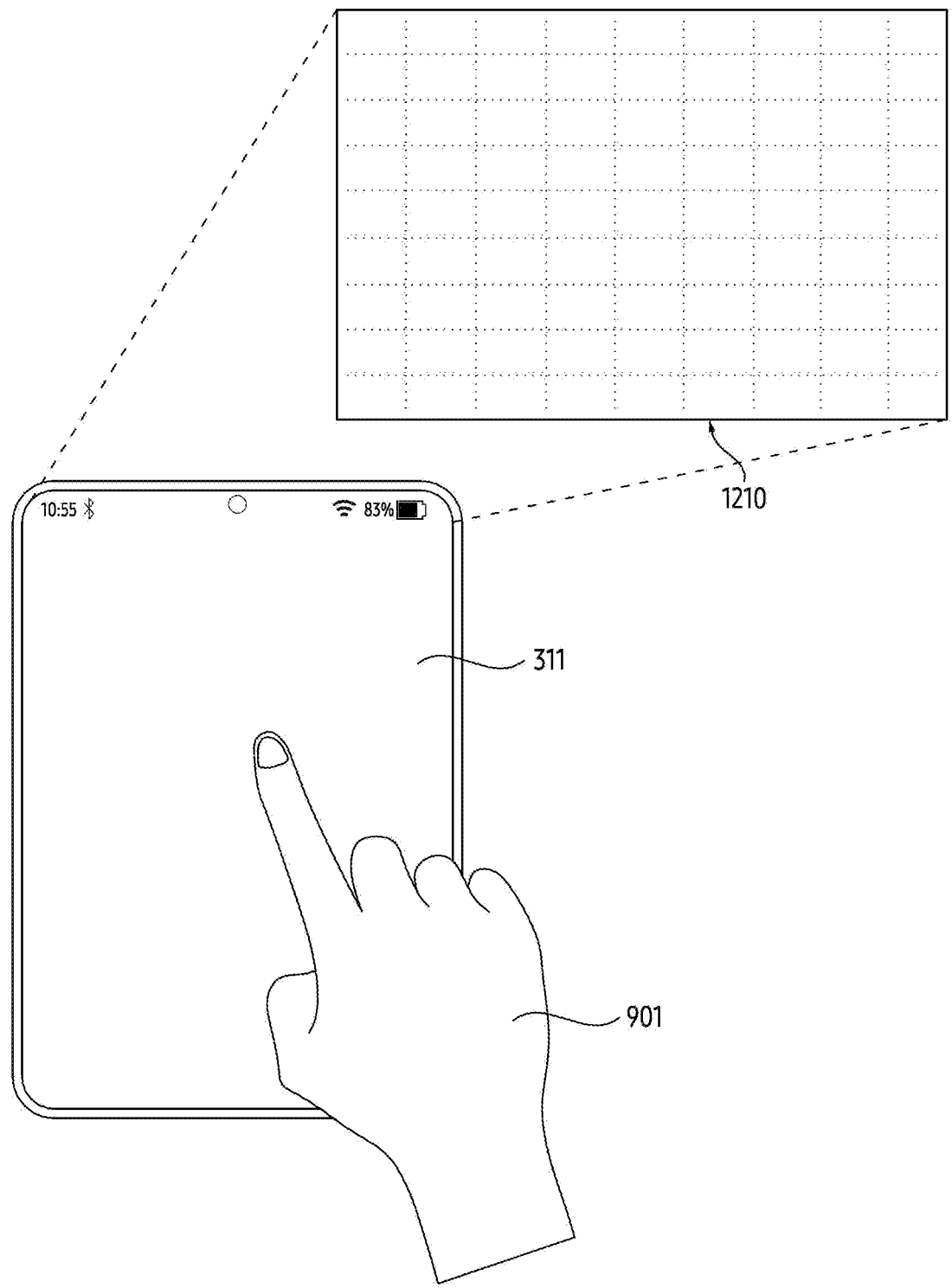
FIGS. 12A to 12C show an example of a method of training a neural network utilized by an exemplary electronic device according to an embodiment.
Figure 12B:
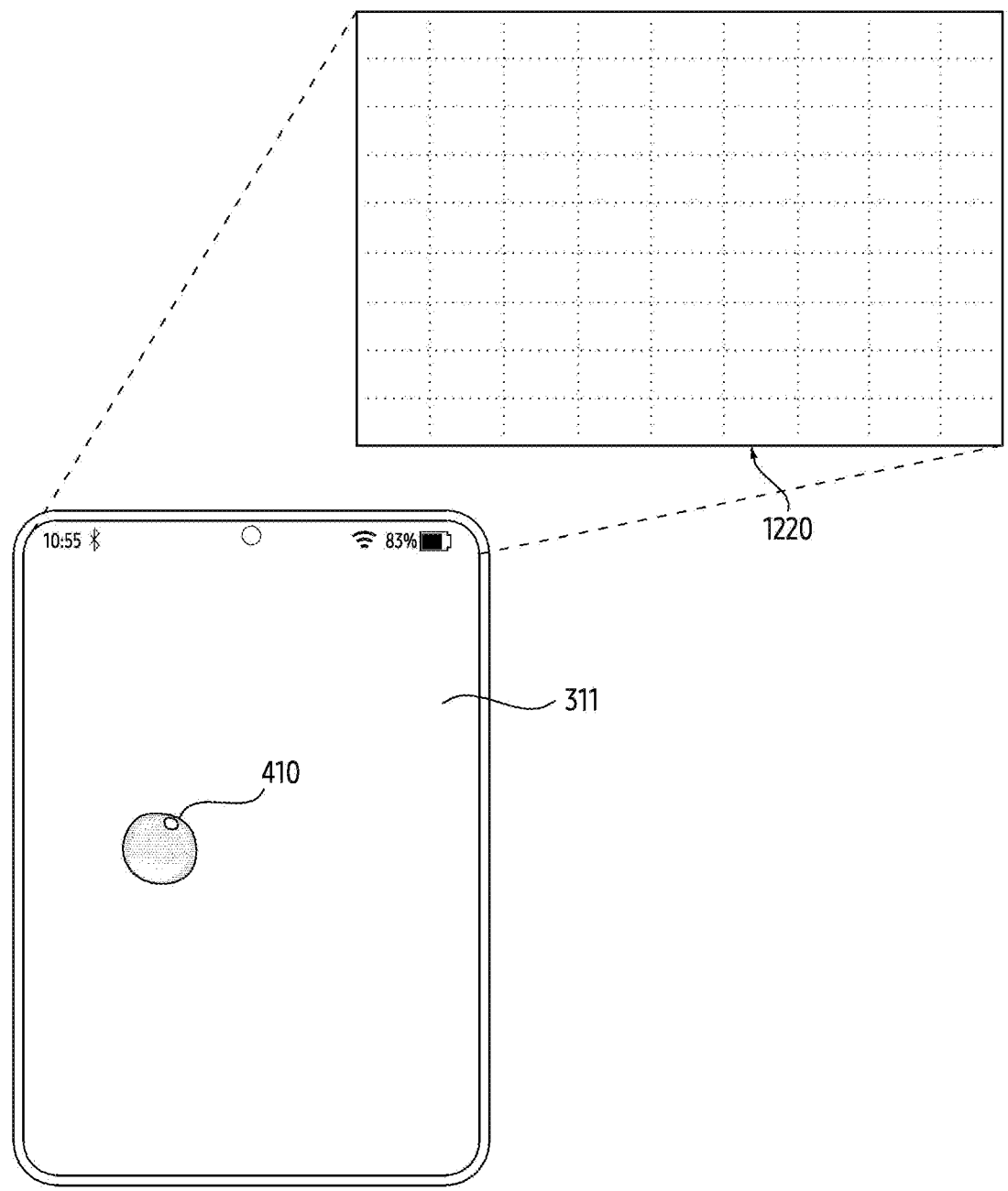
Figure 12C:
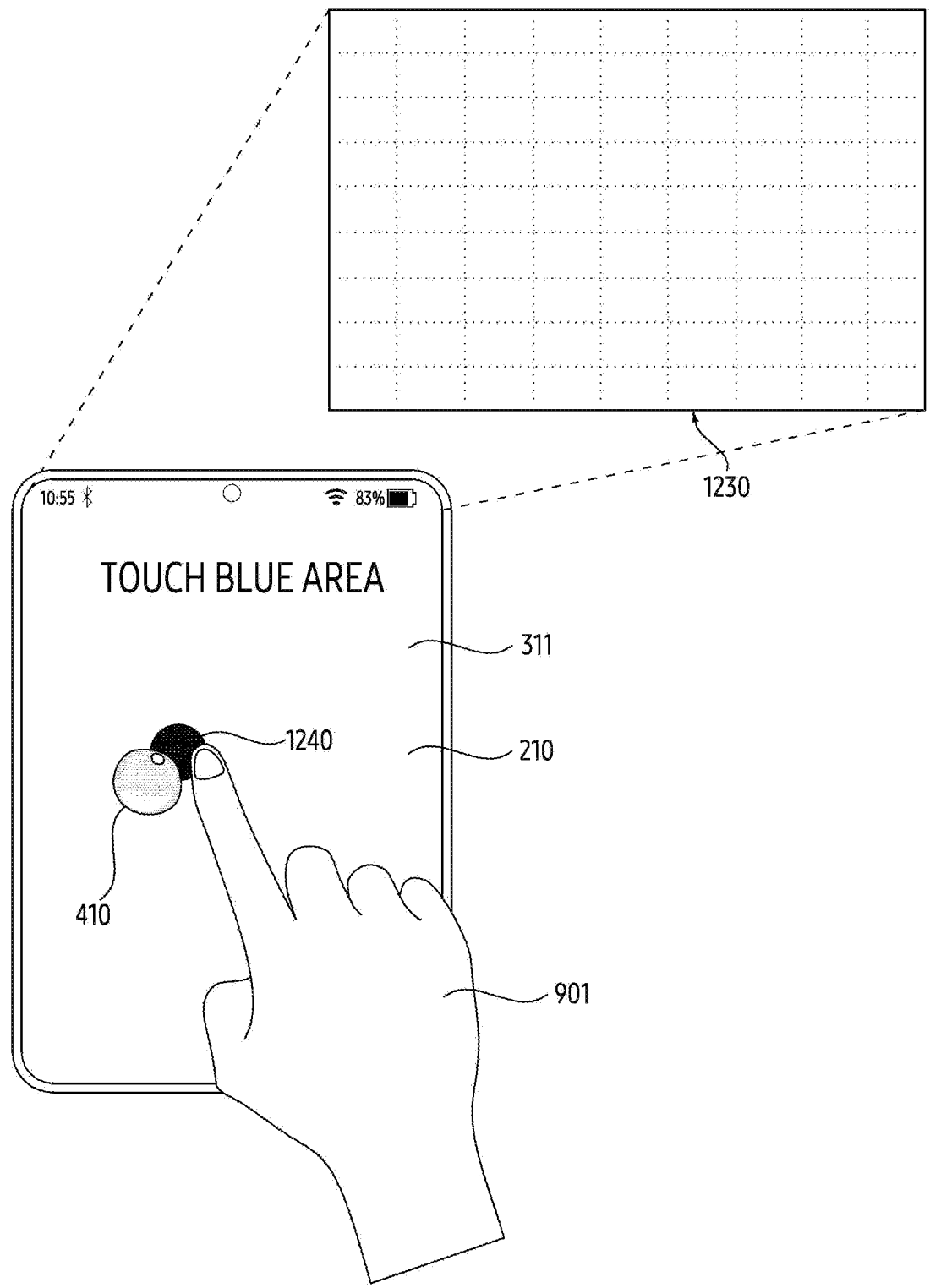

FIGS. 12A to 12C show an example of a method of training a neural network utilized by an exemplary electronic device according to an embodiment.

Referring to FIGS. 12A, 12B, and 12C, according to an embodiment, the processor 120 may utilize a neural network for compensating for distortion that occurs in case that a contact is caused by a body 901 containing a fluid 410. The neural network may be pre-trained before a plurality of node values representing contact by the body 901 containing the fluid 410 are obtained. For example, the neural network may include a convolution neural network (CNN), but is not limited thereto.

For example, referring to FIG. 12A, a control circuit 312 may obtain a plurality of node values 1210 representing a contact of the body 901 excluding the fluid 410. The control circuit 312 may obtain (or identify) a coordinate corresponding to the position of the body 901 based on the plurality of node values 1210. The neural network may be trained based on the plurality of node values 1210 and the coordinates obtained by the control circuit 312 from the plurality of node values 1210. The neural network may classify the plurality of node values 1210 and the coordinates obtained by the control circuit 312 from the plurality of node values 1210, into data obtained when the body 901 is in contact. The neural network may identify that the plurality of node values 1210 are caused by the body 901 and may identify the coordinates obtained by the plurality of node values 1210 as the touch position of the touch input.

For example, referring to FIG. 12B, the control circuit 312 may obtain a plurality of node values 1220 representing a contact by the fluid 410. The control circuit 312 may obtain (or identify) coordinates corresponding to the position of the fluid 410 based on the plurality of node values 1220. The neural network may be trained based on the plurality of node values 1220 and the coordinates obtained by the control circuit 312 from the plurality of node values 1220. The neural network may classify the plurality of node values 1220 and the coordinates obtained by the control circuit 312 from the plurality of node values 1220, into data obtained when the fluid 410 is in contact. The neural network may identify that the plurality of node values 1220 are caused by the fluid 410, and refrain (or bypass) from identifying coordinates obtained from the plurality of node values 1220 as the position of the touch input.

For example, referring to FIG. 12C, the control circuit 312 may obtain a plurality of node values 1230 representing the contact of the body 901 while the fluid 410 is located on the touch sensor 311. The neural network may classify the plurality of node values 1230 into data obtained from the contact of the body 901 on the touch sensor 311 while the fluid 410 is located on the touch sensor 311. The neural network may classify the plurality of node values 1230 as data obtained when the body 901 including the fluid 410 is in contact. The control circuit 312 may obtain a first coordinate based on the plurality of node values 1230. The first coordinate may be obtained when the body 901 is contacted on the touch sensor 311 while the fluid 410 is located on the touch sensor 311. The position of the first coordinate may be different from the touch position by the body 901 due to distortion of the fluid 410. The first coordinate may be represented based on a two-dimensional coordinate system, for example, such as $(x_1, y_1)$. Before the plurality of node values 1230 are obtained, an object 1240 may be displayed on a display 210. The object 1240 may be displayed on the display 210 in order to guide the contact of the body 901. For example, the object 1240 may have a circular or oval shape to induce contact with the user's hand. The object 1240 may be displayed adjacent to the fluid 410, but is not limited thereto. For example, the object 1240 may be displayed at a position far from the fluid 410. For example, the display 210 may display content (e.g., text) to guide the contact of the body 901 so that the body 901 accurately contacts the position of the object 1240. The position of the object 1240 on the display 210 may correspond to a second coordinate. Due to the distortion caused by the fluid 410, the second coordinate may be different from the first coordinate. For example, the second coordinate may be represented based on a two-dimensional coordinate system, for example, such as $(x_2, y_2)$.

According to an embodiment, the neural network may be trained based on the first coordinates and the second coordinates. For example, the neural network may be tuned (or trained) such that the difference between the first coordinate and the second coordinate is minimized. The neural network may identify (or obtain) a first compensation coordinate for compensating for the difference between the first coordinate and the second coordinate. For example, the neural network may be trained, based on regression learning, to identify the first compensation coordinate for minimizing the difference between the first coordinate and the second coordinate. For example, a neural network learning may be performed based on Equation 1 below.

$$\text{loss} = -\sum_{k=1}^{3} p_k \log \hat{p}_k + p_3 \lambda \sqrt{(dx - \hat{dx})^2 + (dy - \hat{dy})^2} \quad \text{[Equation 1]}$$

Here, loss represents a loss, $$-\sum_{k=1}^{3} p_k \log \hat{p}_k$$

represents a classification loss, and $$p_3 \lambda \sqrt{(dx - \hat{dx})^2 + (dy - \hat{dy})^2}$$

represents a regression loss. $p_k$ represents the probability of each type of contact that caused the plurality of node values. For example, p1 represents the probability that contact by a finger is caused, p2 represents the probability that contact by a fluid is caused, and p3 represents the probability that contact by a body containing the fluid is caused. For example, each of the p1, p2, and p3 may be obtained through one-hot encoding for representing natural language (or letters) representing each contact, such as the contact by the finger, the contact by the fluid, and the contact by the body containing the fluid, in numbers (e.g., vectors). For example, the natural language (or characters) representing each contact may be represented as p1, p2, and p3 having the form of numbers (e.g., vectors), based on the one-hot encoding. (dx, dy) represents a second compensation coordinate representing the actual difference between the first coordinate and the second coordinate. For example, in case that the first coordinate is represented as $(x_1, y_1)$, and the second coordinate is represented as $(x_2, y_2)$, the second compensation coordinate may be represented as $(x_2-x_1, y_2-y_1)$. $(\widehat{dx}, \widehat{dy})$ represents the first compensation coordinate for minimizing the difference between the first coordinate and the second coordinate obtained (or identified) by the neural network. $\lambda$ represents a regularization coefficient. For example, $\lambda$ may be a real number that exists in the range of 0 to 1. The neural network may be trained such that loss is minimized. For example, the neural network may calculate the regression loss, only in case that the type of contact identified by the plurality of node values inputted to the neural network is the body 901 containing the fluid 410. For example, the neural network may calculate the regression loss, only in case of k=3.

According to an embodiment, after learning of the neural network is completed, the processor 120 may obtain a plurality of different node values representing contact on the touch sensor 311 from the control circuit 312. For example, the processor 120 may obtain, from the control circuit 312, the plurality of different node values representing the contact on the touch sensor 311, and coordinates obtained by the control circuit 312 from the plurality of different node values. The processor 120 may identify whether the contact on the touch sensor 311 is caused by the body 901 containing the fluid 410 based on the neural network which is received the plurality of different node values. For example, the processor 120 may identify the type of the contact on the touch sensor 311 based on inputting the plurality of different node values into the neural network. For example, the processor 120 may identify the contact as the touch input and may adjust (or change) the coordinates of the contact identified by the control circuit 312 through the neural network, based on identifying that the contact on the touch sensor 311 is caused by the body 901 containing the fluid 410. For example, the processor 120 may obtain coordinates corresponding to the touch position, which is the contact position of the body 901, by correcting the coordinates obtained by the control circuit 312, in case that the contact on the touch sensor 311 is caused by the body 901 containing the fluid 410. For example, the processor 120 may obtain coordinates (e.g., (13.6=10.1+3.5, 15=17.4−2.4)) corresponding to the contact position of the body 901, by obtaining values (e.g., (+3.5, −2.4)) for correcting the coordinates obtained by the control circuit 312 through the neural network, in case that the coordinates obtained by the control circuit 312 are (10.1, 17.4). For example, the processor 120 may identify the contact as the touch input and may identify the coordinates of the contact identified by the control circuit 312 as the touch position, based on that the contact on the touch sensor 311 is caused by the body 901. For example, the processor 120 may identify the contact as the touch input and may refrain from (or bypass) adjusting the coordinates of the contact identified by the control circuit 312, based on that the contact on the touch sensor 311 is caused by the body 901. For example, the processor 120 may be configured to bypass (or refrain from) identifying the contact as the touch input, based on identifying that the contact on the touch sensor 311 is caused by the fluid 410.

According to an embodiment, the processor 120 may provide a notification for guiding removal of the fluid 410 based on identifying that the contact on the touch sensor 311 is caused by the body 901 containing the fluid 410. For example, the processor 120 may display a visual object for guiding the removal of the fluid 410 through the display 210. For example, the processor 120 may provide an audible notification for guiding the removal of the fluid 410 through an audio module (e.g., an audio module 170 of FIG. 1). For example, the processor 120 may provide a tactile notification for guiding the removal of the fluid 410 through a haptic module (e.g., a haptic module 179 of FIG. 1).

As described above, the electronic device 101 according to an embodiment may provide a method which is capable of compensating for distortion of the touch position by the fluid 410 by utilizing the neural network.

Figure 13:
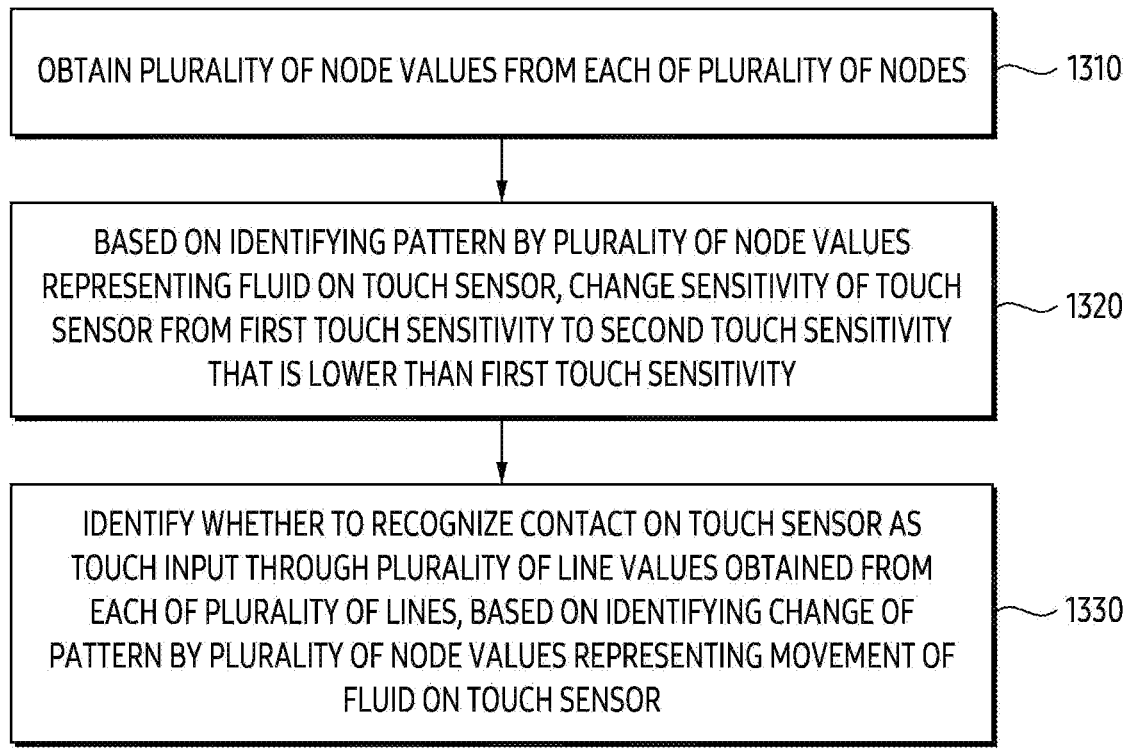
FIG. 13 is a flowchart showing an example of an operation for identifying a fluid on a touch sensor of an exemplary electronic device according to an embodiment.

FIG. 13 is a flowchart showing an example of an operation for identifying a fluid on a touch sensor of an exemplary electronic device according to an embodiment.

Hereinafter, the operation of FIG. 13 will be described based on a processor 120, but the embodiments are not limited thereto. For example, the operation illustrated in FIG. 13 may be performed by at least one of the processor 120 and a control circuit 312.

Referring to FIG. 13, in operation 1310, the processor 120 may obtain a plurality of node values (e.g., a plurality of node values 530 of FIG. 5B, a plurality of node values 540 of FIG. 5C, and/or a plurality of node values 710 of FIG. 7), from each of a plurality of nodes (e.g., a plurality of nodes 314 of FIG. 4). For example, the plurality of node values obtained from each of the plurality of nodes 314 may be transmitted from the control circuit 312 to the processor 120. The processor 120 may obtain (or receive) the plurality of node values from the control circuit 312.

In operation 1320, based on identifying a pattern (e.g., a pattern 531 of FIG. 5B, a pattern 541 of FIG. 5C, and/or a pattern 740 of FIG. 7) by the plurality of node values representing the fluid (e.g., a fluid 410 of FIG. 4) on the touch sensor (e.g., a touch sensor 311 of FIG. 3), the processor 120 may change the sensitivity of the touch sensor 311 from a first touch sensitivity to a second touch sensitivity that is lower than the first touch sensitivity. The pattern may be formed (or defined) by the plurality of node values. For example, the pattern may include at least one node value (e.g., at least one node value 531*a* of FIG. 5B, at least one node value 541*a* of FIG. 5C, and/or at least one node value 711 of FIG. 7) having a negative value, and the plurality of node values (e.g., a plurality of node values 531*b* of FIG. 5B, a plurality of node values 541*b* of FIG. 5C, and/or a plurality of node values 712 of FIG. 7) having a positive value and at least partially surrounding the at least one node value. For example, the plurality of node values may completely surround the at least one node value. For example, the plurality of node values may partially surround the at least one node value. For example, the plurality of node values may enclose the at least one node value. For example, the processor 120 may identify a pattern by at least some of the plurality of node values representing the fluid 410 on the touch sensor 311, based on inputting the plurality of node values into a pre-trained neural network. The processor 120 may change a state of an electronic device (e.g., an electronic device 101 of FIG. 3) to a first state, based on a pattern by the plurality of node values representing the fluid 410 on the touch sensor 311. In the first state of the electronic device 101, the processor 120 and/or the control circuit 312 may identify whether to recognize a contact on the touch sensor 311 as a touch input according to the second touch sensitivity lower than the first touch sensitivity. For example, in the first state of the electronic device 101, the processor 120 and/or the control circuit 312 may identify whether to recognize the contact on the touch sensor 311 as the touch input, based on comparing a second threshold value higher than a first threshold value with the plurality of node values representing the contact on the touch sensor 311.

In operation 1330, the processor 120 may identify whether to recognize the contact on the touch sensor 311 as the touch input through a plurality of line values obtained from each of a plurality of lines (e.g., a plurality of lines 313 of FIG. 4), based on identifying a change of the pattern by a plurality of node values representing movement of the fluid 410 on the touch sensor 311. For example, the processor 120 may identify the change of the pattern by the plurality of node values representing the movement of the fluid 410 on the touch sensor 311, based on inputting the plurality of node values obtained in the first state of the electronic device 101 into the pre-trained neural network. For example, the processor 120 may change the state of the electronic device 101 to a second state that identifies whether the contact on the touch sensor 311 is recognized as the touch input through the plurality of line values, based on the change of the pattern by the plurality of node values representing the movement of the fluid 410 on the touch sensor 311. The processor 120 may change the state of the electronic device 101 from the first state using a mutual-capacitance method and a self-capacitance method to the second state using only the self-capacitance method, based on identifying the changes of the patterns representing the movement of the fluid 410 on the touch sensor 311. In the second state of the electronic device 101, the processor 120 and/or the control circuit 312 may identify whether to recognize the contact on the touch sensor 311 as the touch input according to the self-capacitance method using the plurality of line values. In the second state of the electronic device 101, the processor 120 and/or the control circuit 312 may refrain from (or bypass, or cease) identifying whether to recognize the contact on the touch sensor 311 as the touch input according to the mutual-capacitance method using the plurality of node values and may identify whether to recognize the contact on the touch sensor 311 as the touch input according to the self-capacitance method using the plurality of line values.

As described above, since the electronic device 101 according to an embodiment identifies whether to recognize the contact on the touch sensor 311 as the touch input through the plurality of line values based on the change of the pattern representing the movement of the fluid 410, it may provide a method which is capable of reducing malfunction of the touch sensor 311.

Figure 14:
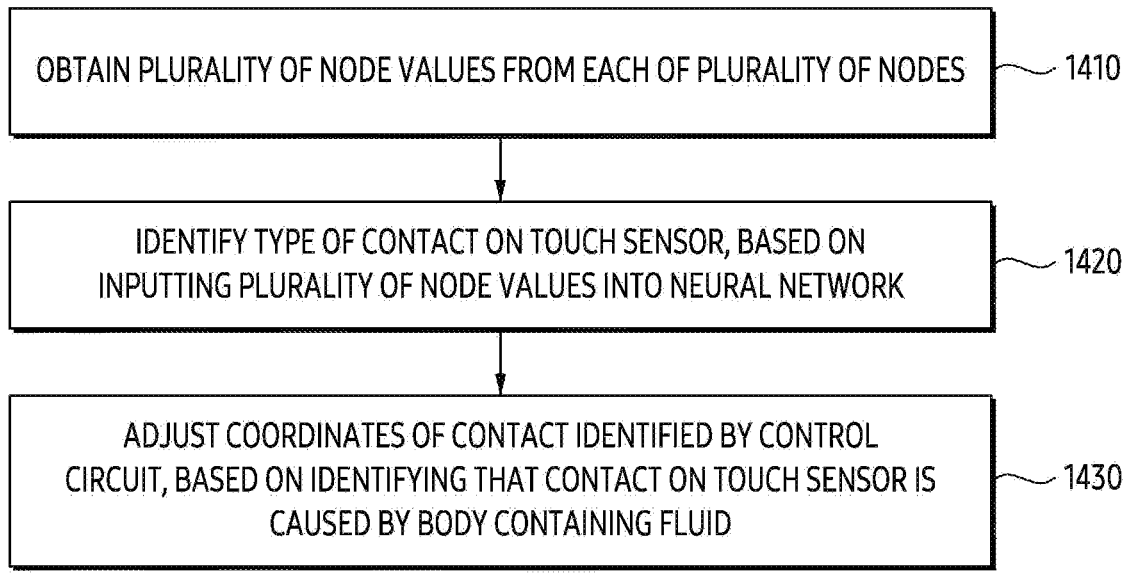
FIG. 14 is a flowchart showing an example of an operation for compensating for distortion of a touch position by a fluid of an exemplary electronic device according to an embodiment.

FIG. 14 is a flowchart showing an example of an operation for compensating for distortion of a touch position by a fluid of an exemplary electronic device according to an embodiment.

The operation illustrated in FIG. 14 may be performed by a processor 120.

Referring to FIG. 14, in operation 1410, the processor 120 may obtain a plurality of node values from each of a plurality of nodes (e.g., a plurality of nodes 314 of FIG. 4). For example, the processor 120 may obtain the plurality of node values obtained from each of the plurality of nodes 314 from the control circuit 312. The processor 120 may obtain, from the control circuit 312, the plurality of node values obtained from each of the plurality of nodes 314, and a coordinate identified from the control circuit 312 by the plurality of node values. The coordinates may represent a touch position of a contact that causes the plurality of node values identified by the control circuit 312. For example, the plurality of node values may be obtained in a second state of an electronic device 101, but is not limited thereto. The plurality of node values of operation 1410 may be referred to as raw data. For example, the plurality of node values in operation 1410 may be obtained in a third state that is distinct from a first state and the second state of the electronic device 101. For example, in the third state of the electronic device 101, the processor 120 and/or the control circuit 312 may identify whether to recognize a contact on a touch sensor (e.g., a touch sensor 311 of FIG. 3) as a touch input according to a first touch sensitivity. For example, in the third state of the electronic device 101, the processor 120 and/or the control circuit 312 may identify whether to recognize the contact on the touch sensor 311 as the touch input based on a first threshold.

In operation 1420, the processor 120 may identify the type of contact on the touch sensor 311, based on inputting the plurality of node values into a neural network. The processor 120 may identify the type of contact that caused the plurality of node values through the neural network. The processor 120 may identify whether the contact on the touch sensor 311 is caused by a body containing the fluid (e.g., a fluid 410 of FIG. 4), based on inputting the plurality of node values into a pre-trained neural network.

In operation 1430, the processor 120 may adjust the coordinates of the contact identified by the control circuit 312, based on identifying that the contact on the touch sensor 311 is caused by the body containing the fluid 410. For example, the processor 120 may identify the contact as the touch input and may adjust the coordinates through the neural network so that the coordinates of the contact correspond to the position of the contact, based on identifying that the contact on the touch sensor 311 is caused by the body containing the fluid 410. For example, by the fluid 410 placed on the touch sensor 311, the coordinates of the contact identified by the control circuit 312 may be distorted. The electronic device (e.g., the electronic device 101 of FIG. 3) according to an embodiment may provide a method which is capable of compensating for distortion of coordinates by the fluid 410, since it adjusts the coordinates of the contact identified by the control circuit 312 based on identifying that the contact on the touch sensor 311 is caused by the body containing the fluid 410. However, it is not limited thereto.

According to an embodiment, the processor 120 may identify the contact as the touch input and may refrain from (or bypass) changing the coordinates of the contact identified by the control circuit 312, based on identifying that the contact on the touch sensor 311 is caused by the body. For example, the processor 120 may identify the contact as the touch input and may identify the coordinates of the contact identified by the control circuit 312 as the touch position, based on identifying that the contact on the touch sensor 311 is caused by the body.

According to an embodiment, the processor 120 may refrain from (or bypass) identifying the contact as the touch input, based on identifying that the contact on the touch sensor 311 is caused by the fluid 410. For example, the processor 120 may refrain from (or bypass) identifying the contact as the touch input and may discard the coordinates obtained by the control circuit 312, based on identifying that the contact on the touch sensor 311 is caused by the fluid 410.

As described above, the electronic device 101 according to an embodiment may provide a method which is capable of compensating for distortion of the touch position by the fluid 410, based on identifying the type of contact on the touch sensor 311.

As the electronic device is carried by the user, the electronic device may be exposed to various environments. For example, the electronic device may be exposed to the fluid (e.g., moisture). In case that the electronic device is exposed to the fluid, malfunction of the touch sensor by the fluid may be caused. The electronic device may need a method for reducing the malfunction of the touch sensors.

The technical challenges intended to be accomplished in this document are not limited to the technical challenges mentioned above, other technical challenges not mentioned will be clearly understood by those with ordinary knowledge in the technical field belonging to this document from the following description.

An electronic device (e.g., an electronic device 101 of FIG. 3) is provided. According to an embodiment, the electronic device may comprise a display (e.g., a display 210 of FIG. 3). According to an embodiment, the electronic device may comprise a touch sensor (e.g., a touch sensor 311 of FIG. 4) disposed in the display and including a plurality of lines (e.g., a plurality of lines 313 of FIG. 4), and a plurality of nodes (e.g., a plurality of nodes 314 of FIG. 4) formed by the plurality of lines. According to an embodiment, the electronic device may comprise at least one processor (e.g., a processor 120 of FIG. 3). According to an embodiment, the at least one processor may be configured to obtain a plurality of node values (e.g., a plurality of node values 530 of FIG. 5B, a plurality of node values 540 of FIG. 5C, and/or a plurality of node values 710 of FIG. 7)) obtained from each of the plurality of nodes. According to an embodiment, the at least one processor may be configured to change a touch sensitivity of the touch sensor from a first touch sensitivity to a second touch sensitivity lower than the first touch sensitivity based on identifying a pattern (e.g., a pattern 531 of FIG. 5B, a pattern 541 of FIG. 5C, and/or a pattern 740 of FIG. 7)) by the plurality of node values representing a fluid on the touch sensor. According to an embodiment, the at least one processor may be configured to identify whether to recognize a contact on the touch sensor as a touch input through a plurality of line values obtained from each of the plurality of lines based on identifying a change of the pattern by the plurality of node values representing movement of the fluid on the touch sensor.

The electronic device according to an embodiment may provide a method which is capable of reducing malfunction of a touch sensor, since it identifies whether a contact on the touch sensor is recognized as a touch input through a plurality of line values based on a change of the pattern representing the movement of the fluid.

According to an embodiment, the pattern may include at least one first node value (e.g., at least one node value 531*a* of FIG. 5B, at least one node value 541*a* of FIG. 5C, and/or at least one node value 711 of FIG. 7) having a negative value among the plurality of node values. According to an embodiment, the pattern may include a plurality of second node values (e.g., a plurality of node values 531*b* of FIG. 5B, a plurality of node values 541*b* of FIG. 5C, and/or a plurality of node values 712 of FIG. 7) surrounding the at least one first node value and having a positive value among the plurality of node values.

An electronic device according to an embodiment may provide a method which is capable of identifying that a relatively large amount of water has been touched on the touch sensor based on a change of the pattern.

According to an embodiment, the electronic device may comprise a sensor (e.g., a sensor 320 of FIG. 3) for identifying an angle of the electronic device. According to an embodiment, the at least one processor may be configured to identify whether the angle of the electronic device is within a designated angle range through the sensor. According to an embodiment, the at least one processor may be configured to identify whether to recognize the contact on the touch sensor as the touch input through the plurality of line values based on identifying that the angle is within the designated angle range and the change in the pattern by the plurality of node values.

The electronic device according to an embodiment may identify whether the electronic device is in a state where it is worn by the user, through the angle identified through the sensor.

According to an embodiment, the plurality of node values may be obtained frame by frame according to the frequency set for displaying an image on the display. According to an embodiment, the at least one processor may be configured to change the touch sensitivity of the touch sensor from the first touch sensitivity to the second touch sensitivity based on identifying the pattern by the plurality of node values for a designated number of frames.

An electronic device according to an embodiment may provide a method of changing the sensitivity of the touch sensor, based on identifying a pattern representing the fluid for the designated number of frames.

According to an embodiment, the at least one processor may be configured to identify whether to recognize the contact on the touch sensor as the touch input through comparing at least some of the plurality of node values with a first threshold value in the first touch sensitivity. According to an embodiment, the at least one processor may be configured to identify whether to recognize the contact on the touch sensor as the touch input through comparing the at least some of the plurality of node values with a second threshold value higher than the first threshold value in the second touch sensitivity.

The electronic device according to an embodiment may reduce malfunction caused by the fluid of the touch sensor, since it adjusts the touch sensitivity based on identifying fluid on the touch sensor through the pattern.

According to an embodiment, the plurality of lines may include a plurality of first lines (e.g., a plurality of first lines 313a of FIG. 4) extending along the first direction. According to an embodiment, the plurality of lines may include a plurality of second lines (e.g., a plurality of first lines 313b of FIG. 4) extending along the second direction different from the first direction, and intersecting the plurality of first lines. According to an embodiment, the plurality of nodes may be located at points where the plurality of first lines and the plurality of second lines intersect.

According to an embodiment, the at least one processor may be configured to identify whether to recognize the contact on the touch sensor as the touch input through the plurality of line values based on identifying movement of the pattern by the plurality of node values moving along the direction of movement of the fluid on the touch sensor for a designated time.

The electronic device according to an embodiment may provide a method which is capable of reducing malfunction caused by the fluid of the touch sensor, since it identifies whether a contact on the touch sensor is recognized as a touch input through a plurality of line values based on a change of the pattern representing the movement of the fluid.

According to an embodiment, the electronic device may comprise a supporting member supporting the display. According to an embodiment, the pattern may include at least one first node value (e.g., at least one node value 711 of FIG. 7) having a negative value, and a plurality of second node values (e.g., a plurality of node values 712 of FIG. 7) surrounding the at least one first value and having a positive value in a state where the fluid is spaced apart from the supporting member. According to an embodiment, the pattern may include a plurality of third node values (e.g., a plurality of node values 731 of FIG. 7) having a positive value in a state where at least a portion of the fluid is in contact with the supporting member.

An electronic device according to an embodiment may provide a method of changing the state of the touch sensor to reduce the malfunction of the touch sensor, by identifying a change of the pattern including the movement of the pattern.

According to an embodiment, the electronic device may comprise a control circuit (e.g., a control circuit 312 of FIG. 3) configured to control the touch sensor. According to an embodiment, the at least one processor may be configured to receive a plurality of different node values representing the contact from the control circuit. According to an embodiment, the at least one processor may be configured to identify whether the contact is caused by a body containing the fluid based on a neural network receiving the plurality of different node values. The at least one processor may be configured to identify the contact as the touch input and adjust coordinates of the contact identified by the control circuit through the neural network based on identifying that the contact is caused by the body containing the fluid.

The electronic device according to an embodiment may provide a method of compensating for distortion caused by the fluid by identifying whether the contact on the touch sensor was caused by the body containing the fluid.

According to an embodiment, the at least one processor may be configured to bypass identifying the contact as the touch input and changing the coordinates of the contact identified by the control circuit based on the contact being caused by the body. According to an embodiment, the at least one processor may be configured to bypass identifying the contact as the touch input based on identifying that the contact is caused by the fluid.

An electronic device according to an embodiment may provide a method of reducing the distortion caused by the fluid by identifying whether the contact on the touch sensor is caused by the body containing the fluid.

According to an embodiment, the neural network may be trained based on a first coordinate obtained when the body contact with the touch sensor and a second coordinate corresponding to position of an object on the display to guide a contact of the body while the fluid is placed on the touch sensor.

According to an embodiment, the at least one processor may be configured to provide a notification to guide removal of the fluid based on identifying that the contact is caused by the body containing the fluid.

According to an embodiment, the electronic device may comprise a supporting member (e.g., a supporting member 510 of FIG. 5A) supporting the display. According to an embodiment, the electronic device may comprise a plurality of straps (e.g., a plurality of straps 520 of FIG. 5A) coupled to the supporting member and in contact with a part of body of a user when the electronic device is worn by the user.

According to an embodiment, the at least one processor may be configured to identify the pattern by the plurality of node values representing the fluid on the touch sensor through a neural network model which is pre-trained.

According to an embodiment, the at least one processor may be configured to refrain from identifying whether to recognize the contact on the touch sensor as the touch input through the plurality of node values based on identifying the change in the pattern by the plurality of node values representing the movement of the fluid on the touch sensor.

The electronic device according to an embodiment may minimize the malfunction of the touch sensor, by identifying whether the contact on the touch sensor is recognized as the touch input according to the self-capacitance method and by not identifying whether the contact on the touch sensor is recognized as the touch input according to the mutual-capacitance method, based on identifying the changes of the pattern.

A method of operating an electronic device (e.g., an electronic device 101 of FIG. 3) is provided. According to an embodiment, the method may comprise obtaining a plurality of node values (e.g., a plurality of node values 530 of FIG. 5B, a plurality of node values 540 of FIG. 5C, and/or a plurality of node values 710 of FIG. 7) from each of a plurality of nodes (e.g., a plurality of nodes 314 of FIG. 4) formed by a plurality of lines (e.g., a plurality of lines 313 of FIG. 4) in a touch sensor. According to an embodiment, the method may comprise reducing a touch sensitivity of the touch sensor based on identifying a pattern (e.g., a pattern 531 of FIG. 5B, a pattern 541 of FIG. 5C, and/or a pattern 740 of FIG. 7) by the plurality of node values representing a fluid on the touch sensor. According to an embodiment, the method may comprise identifying whether to recognize a contact on the touch sensor as a touch input through a plurality of line values obtained from each of the plurality of lines based on identifying a change of the pattern by the plurality of node values representing movement of the fluid on the touch sensor.

The electronic device according to an embodiment may provide a method which is capable of reducing malfunction of a touch sensor, since it identifies whether a contact on the touch sensor is recognized as a touch input through a plurality of line values based on a change of the pattern representing the movement of the fluid.

According to an embodiment, the method may comprise identifying whether the angle of the electronic device is within a designated angle range through the sensor (e.g., a sensor 320 of FIG. 3). According to an embodiment, the method may comprise identifying whether to recognize the contact on the touch sensor as the touch input through the plurality of line values based on identifying that the angle is within the designated angle range and the change in the pattern by the plurality of node values.

A computer-readable storage medium storing one or more programs is provided. According to an embodiment, the one or more programs, when executed by at least one processor (e.g., a processor 120 of FIG. 3) of the electronic device (e.g., an electronic device 101 of FIG. 3), may include instructions that cause the electronic device for obtaining a plurality of node values (e.g., a plurality of node values 530 of FIG. 5B, a plurality of node values 540 of FIG. 5C, and/or a plurality of node values 710 of FIG. 7) obtained from each of a plurality of nodes (e.g., a plurality of nodes 314 of FIG. 4) formed by a plurality of lines in a touch sensor. According to an embodiment, the one or more programs, when executed by at least one processor of the electronic device, may include instructions that cause the electronic device for obtaining a plurality of node values from each of a plurality of nodes formed by a plurality of lines in a touch sensor. According to an embodiment, the one or more programs, when executed by at least one processor of the electronic device, may include instructions that cause the electronic device for changing a touch sensitivity of the touch sensor from a first touch sensitivity to a second touch sensitivity lower than the first touch sensitivity based on identifying a pattern (e.g., a pattern 531 of FIG. 5B, a pattern 541 of FIG. 5C, and/or a pattern 740 of FIG. 7) by the plurality of node values representing a fluid on the touch sensor. According to an embodiment, the one or more programs, when executed by at least one processor of the electronic device, may include instructions that cause the electronic device for identifying whether to recognize a contact on the touch sensor as a touch input through a plurality of line values obtained from each of the plurality of lines based on identifying a change of the pattern by the plurality of node values representing movement of the fluid on the touch sensor.

The electronic device according to an embodiment may provide a method which is capable of reducing malfunction of a touch sensor, since it identifies whether a contact on the touch sensor is recognized as a touch input through a plurality of line values based on a change of the pattern representing the movement of the fluid.

According to an embodiment, the one or more programs, when executed by at least one processor of the electronic device, may include instructions that cause the electronic device for identifying whether the angle of the electronic device is within a designated angle range through the sensor, and identifying whether to recognize the contact on the touch sensor as the touch input through the plurality of line values based on identifying that the angle is within the designated angle range and the change in the pattern by the plurality of node values.

The effects that may be obtained from the disclosure are not limited to the effects mentioned above, and other effects not mentioned may be clearly understood by a person having ordinary knowledge in the technical field to which the disclosure belongs from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a touch sensor disposed in the display and including a plurality of lines, and a plurality of nodes formed by the plurality of lines;
    a memory storing instructions; and
    a processor,
    wherein the instructions, when being executed by the processor, cause the electronic device to:
        obtain a plurality of node values from each of the plurality of nodes,
        change a touch sensitivity of the touch sensor from a first touch sensitivity to a second touch sensitivity lower than the first touch sensitivity based on identifying a pattern by the plurality of node values representing a fluid on the touch sensor, and
        identify whether to recognize a contact on the touch sensor as a touch input through a plurality of line values obtained from each of the plurality of lines based on identifying a change of the pattern by the plurality of node values representing movement of the fluid on the touch sensor.

2. The electronic device of claim 1, wherein the pattern includes:
    at least one first node value having a negative value among the plurality of node values; and
    a plurality of second node values surrounding the at least one first node value and having a positive value among the plurality of node values.

3. The electronic device of claim 1, further comprising:
    a sensor for identifying an angle of the electronic device,
    wherein the instructions, when being executed by the processor, cause the electronic device to:
        identify whether the angle of the electronic device is within a designated angle range through the sensor, and
        identify whether to recognize the contact on the touch sensor as the touch input through the plurality of line values based on identifying that the angle is within the designated angle range and the change in the pattern by the plurality of node values.

4. The electronic device of claim 1,
    wherein, the plurality of node values are obtained frame by frame according to frequency set for displaying an image on the display, and
    wherein the instructions, when being executed by the processor, cause the electronic device to change the touch sensitivity of the touch sensor from the first touch sensitivity to the second touch sensitivity based on identifying the pattern by the plurality of node values for a designated number of frames.

5. The electronic device of claim 1,
wherein the instructions, when being executed by the processor, cause the electronic device to:
identify whether to recognize the contact on the touch sensor as the touch input through comparing at least some of the plurality of node values with a first threshold value in the first touch sensitivity; and
identify whether to recognize the contact on the touch sensor as the touch input through comparing the at least some of the plurality of node values with a second threshold value higher than the first threshold value in the second touch sensitivity.

6. The electronic device of claim 1,
wherein the plurality of lines include:
a plurality of first lines extending along a first direction; and
a plurality of second lines extending along a second direction different from the first direction, and intersecting the plurality of first lines, and
wherein the plurality of nodes are located at points where the plurality of first lines and the plurality of second lines intersect.

7. The electronic device of claim 1,
wherein the instructions, when being executed by the processor, cause the electronic device to identify whether to recognize the contact on the touch sensor as the touch input through the plurality of line values based on identifying movement of the pattern by the plurality of node values moving along a direction of movement of the fluid on the touch sensor for a designated time.

8. The electronic device of claim 1, further comprising:
a supporting member supporting the display,
wherein the pattern includes at least one first node value having a negative value, and a plurality of second node values surrounding the at least one first node value and having a positive value in a state where the fluid is spaced apart from the supporting member, and
wherein the pattern includes a plurality of third node values having a positive value in a state where at least a portion of the fluid is in contact with the supporting member.

9. The electronic device of claim 1, further comprising:
a control circuit configured to control the touch sensor,
wherein the instructions, when being executed by the processor, cause the electronic device to:
receive a plurality of different node values representing the contact from the control circuit,
identify whether the contact is caused by a body containing the fluid based on a neural network receiving the plurality of different node values, and
identify the contact as the touch input and adjust coordinates of the contact identified by the control circuit through the neural network based on identifying that the contact is caused by the body containing the fluid.

10. The electronic device of claim 9,
wherein the instructions, when being executed by the processor, cause the electronic device to:
bypass identifying the contact as the touch input and changing the coordinates of the contact identified by the control circuit based on the contact being caused by the body; and
bypass identifying the contact as the touch input based on identifying that the contact is caused by the fluid.

11. The electronic device of claim 9,
wherein the neural network is trained based on a first coordinate obtained when the body contact with the touch sensor and a second coordinate corresponding to position of an object on the display to guide a contact of the body while the fluid is placed on the touch sensor.

12. The electronic device of claim 9,
wherein the instructions, when being executed by the processor, cause the electronic device to provide a notification to guide removal of the fluid based on identifying that the contact is caused by the body containing the fluid.

13. The electronic device of claim 1, further comprising:
a supporting member supporting the display; and
a plurality of straps coupled to the supporting member and in contact with a part of body of a user when the electronic device is worn by the user.

14. The electronic device of claim 1,
wherein the instructions, when being executed by the processor, cause the electronic device to identify the pattern by the plurality of node values representing the fluid on the touch sensor through a neural network model which is pre-trained.

15. The electronic device of claim 1,
wherein the instructions, when being executed by the processor, cause the electronic device to refrain from identifying whether to recognize the contact on the touch sensor as the touch input through the plurality of node values based on identifying the change in the pattern by the plurality of node values representing the movement of the fluid on the touch sensor.

16. A method of operating an electronic device, the method comprising:
obtaining a plurality of node values from each of a plurality of nodes formed by a plurality of lines in a touch sensor;
reducing a touch sensitivity of the touch sensor based on identifying a pattern by the plurality of node values representing a fluid on the touch sensor; and
identifying whether to recognize a contact on the touch sensor as a touch input through a plurality of line values obtained from each of the plurality of lines based on identifying a change of the pattern by the plurality of node values representing movement of the fluid on the touch sensor.

17. The method of claim 16, wherein the pattern includes:
at least one first node value having a negative value among the plurality of node values; and
a plurality of second node values surrounding the at least one first node value and having a positive value among the plurality of node values.

18. The method of claim 16, further comprising:
identifying whether an angle of the electronic device is within a designated angle range through the sensor; and
identifying whether to recognize the contact on the touch sensor as the touch input through the plurality of line values based on identifying that the angle is within the designated angle range and the change in the pattern by the plurality of node values.

19. A non-transitory computer-readable storage medium storing one or more programs including instructions, wherein the instructions, when being executed by a processor of an electronic device, cause the electronic device to:
obtaining a plurality of node values from each of a plurality of nodes formed by a plurality of lines in a touch sensor;
changing a touch sensitivity of the touch sensor from a first touch sensitivity to a second touch sensitivity lower than the first touch sensitivity based on identifying a pattern by the plurality of node values representing a fluid on the touch sensor; and identifying whether to recognize a contact on the touch sensor as a touch input through a plurality of line values obtained from each of the plurality of lines based on identifying a change of the pattern by the plurality of node values representing movement of the fluid on the touch sensor.

20. The non-transitory computer readable storage medium of claim 19, wherein, the one or more programs including instructions, wherein the instructions, when being executed by the processor, cause the electronic device to: identifying whether an angle of the electronic device is within a designated angle range through the sensor; and identifying whether to recognize the contact on the touch sensor as the touch input through the plurality of line values based on identifying that the angle is within the designated angle range and a change in the pattern by the plurality of node values.

* * * * *